United States Patent

Bambara et al.

[11] Patent Number: 5,883,144
[45] Date of Patent: Mar. 16, 1999

[54] SILANE-GRAFTED MATERIALS FOR SOLID AND FOAM APPLICATIONS

[75] Inventors: John D. Bambara; Matthew L. Kozma, both of Osterville; Robert F. Hurley, Centerville, all of Mass.

[73] Assignee: Sentinel Products Corp., Hyannis, Mass.

[21] Appl. No.: 749,740

[22] Filed: Nov. 15, 1996

Related U.S. Application Data

[63] Continuation-in-part of Ser. No. 308,801, Sep. 19, 1994, abandoned.

[51] Int. Cl.$^6$ .................................................. C08F 210/00
[52] U.S. Cl. .......................... 521/144; 521/79; 521/82; 525/63; 525/64; 525/70; 525/191; 264/45.7; 264/45.9; 264/232; 264/239
[58] Field of Search ................. 521/144, 79, 82; 264/45.7, 45.9, 232, 239; 525/63, 64, 70, 191

[56] References Cited

U.S. PATENT DOCUMENTS

| | | | |
|---|---|---|---|
| 3,645,155 | 2/1972 | Robinson | 83/663 |
| 3,645,992 | 2/1972 | Elston | 260/80.78 |
| 3,965,054 | 6/1976 | Nojiri et al. | 260/2.5 HA |
| 3,996,171 | 12/1976 | Holland et al. | |
| 4,053,341 | 10/1977 | Kleiner et al. | 156/79 |
| 4,058,583 | 11/1977 | Glander et al. | 264/176 R |

(List continued on next page.)

FOREIGN PATENT DOCUMENTS

| | | |
|---|---|---|
| 0 702 032 A2 | 3/1996 | European Pat. Off. . |
| WO 90/03414 | 4/1990 | WIPO . |
| WO 92/14784 | 9/1992 | WIPO . |
| WO 93/03093 | 2/1993 | WIPO . |

OTHER PUBLICATIONS

Borg, "Ethylene/Propylene Rubber" *Rubber Technology*, Van Nostrand Reinhold Company, pp. 220–248, 1973.
Mukherjee et al., "Radiation–Induced Changes in Polyolefins" *Rev. Macromol. Chem. Phys.*, C26(3):415–436, 1986.
Park, "Handbook of Polymeric Foams and Foam Technology, Polyolefin Foam," Oxford University Press, Chapter 9 pp. 156–242.
Ultsch & Fritz, "Crosslinking of LLDPE and VLDPE via graft polymerized vinyltrimethoxysilane" *Rubber Processing and Applications*, 13:81–91, 1990.

*Primary Examiner*—Duc Truong
*Attorney, Agent, or Firm*—Fish & Richardson P.C.

[57] ABSTRACT

New cross-linked polymeric foam compositions, and methods for making the same, are provided. The new compositions utilize novel cross-linked polyolefin copolymers and show improvements in strength, toughness, flexibility, heat resistance and heat-sealing temperature ranges as compared to conventional low density polyethylene compositions. The new compositions also show processing improvements over linear low density polyethylene. The novel polyolefins, which are essentially linear, comprise ethylene polymerized with at least one alpha-unsaturated C3 to C20 olefinic comonomer, and optionally at least one C3 to C20 polyene, and exhibit, in an uncross-linked sense, a resin density in the range of about 0.86 g/cm$^3$ to about 0.96 g/cm$^3$, a melt index in the range of about 0.5 dg/min to about 100 dg/min, a molecular weight distribution in the range of from about 1.5 to about 3.5, and a composition distribution breadth index greater than about 45 percent. The polyolefins are silane-grafted to enhance the physical properties and processability of the resins. Slow silane-grafted materials exhibit enhanced physical and processing properties.

47 Claims, 3 Drawing Sheets

U.S. PATENT DOCUMENTS

| | | | |
|---|---|---|---|
| 4,062,712 | 12/1977 | Stark . | |
| 4,076,698 | 2/1978 | Anderson et al. | 526/348.6 |
| 4,089,818 | 5/1978 | Slocumb . | |
| 4,102,829 | 7/1978 | Watanabe et al. | 521/81 |
| 4,110,269 | 8/1978 | Ehrenfruend . | |
| 4,117,195 | 9/1978 | Swarbrick et al. | 428/379 |
| 4,160,072 | 7/1979 | Shinkai et al. | 521/86 |
| 4,181,762 | 1/1980 | Benedyk | 428/97 |
| 4,182,398 | 1/1980 | Salyer et al. | 165/1 |
| 4,203,815 | 5/1980 | Noda et al. | 204/159.2 |
| 4,226,946 | 10/1980 | Park et al. | 521/988.5 |
| 4,333,898 | 6/1982 | Schmidtchen | 264/45.9 |
| 4,337,321 | 6/1982 | Allada . | |
| 4,389,514 | 6/1983 | Schmidle et al. | 525/364 |
| 4,444,948 | 4/1984 | Hochstrasser | 525/61 |
| 4,464,425 | 8/1984 | Voigt et al. | 428/35 |
| 4,526,930 | 7/1985 | Keogh | 525/105 |
| 4,554,293 | 11/1985 | Park | 521/81 |
| 4,581,383 | 4/1986 | Park | 521/91 |
| 4,591,606 | 5/1986 | Bergstrom | 521/79 |
| 4,694,025 | 9/1987 | Park | 521/88 |
| 4,702,868 | 10/1987 | Pontiff et al. | 264/50 |
| 4,714,716 | 12/1987 | Park | 521/80 |
| 4,725,492 | 2/1988 | Yazaki et al. | 428/317.7 |
| 4,759,992 | 7/1988 | Tomko et al. | 428/447 |
| 4,762,860 | 8/1988 | Park | 521/88 |
| 4,767,814 | 8/1988 | Bae et al. | 524/284 |
| 4,818,789 | 4/1989 | Tomko et al. | 525/64 |
| 4,837,272 | 6/1989 | Kelley | 525/59 |
| 4,870,111 | 9/1989 | Donuiff et al. | 521/60 |
| 4,873,042 | 10/1989 | Topcik | 264/211.24 |
| 4,900,490 | 2/1990 | Kozma . | |
| 4,908,166 | 3/1990 | Salyer | 264/22 |
| 4,937,284 | 6/1990 | Bergstrom | 525/57 |
| 4,937,299 | 6/1990 | Ewen et al. | 526/119 |
| 4,940,632 | 7/1990 | Nicola et al. . | |
| 4,960,830 | 10/1990 | Hazelton et al. . | |
| 5,026,736 | 6/1991 | Pontiff | 527/60 |
| 5,047,476 | 9/1991 | Keogh | 525/106 |
| 5,053,446 | 10/1991 | Salyer | 524/8 |
| 5,064,802 | 11/1991 | Stevens et al. . | |
| 5,064,903 | 11/1991 | Peiffer . | |
| 5,086,121 | 2/1992 | Hazelton et al. . | |
| 5,112,918 | 5/1992 | Boocock et al. . | |
| 5,112,919 | 5/1992 | Furrer et al. | 525/263 |
| 5,132,380 | 7/1992 | Stevens et al. . | |
| 5,152,204 | 10/1992 | Struglinski | 252/52 R |
| 5,186,851 | 2/1993 | Gutierrez et al. | 252/49.006 |
| 5,206,075 | 4/1993 | Hodgson, Jr. . | |
| 5,246,783 | 9/1993 | Spenadel et al. . | |
| 5,268,115 | 12/1993 | Gutierrez et al. | 252/51.5 R |
| 5,272,236 | 12/1993 | Lai et al. | 526/348.5 |
| 5,275,747 | 1/1994 | Gutierrez et al. | 252/51.005 A |
| 5,277,833 | 1/1994 | Song et al. | 252/56 R |
| 5,278,264 | 1/1994 | Spaleck et al. | 556/127 |
| 5,278,272 | 1/1994 | Lai et al. | 526/348.5 |
| 5,288,762 | 2/1994 | Park et al. | 521/79 |
| 5,304,580 | 4/1994 | Shibayama et al. . | |
| 5,322,728 | 6/1994 | Davey et al. . | |
| 5,329,033 | 7/1994 | Spaleck et al. | 556/53 |
| 5,340,840 | 8/1994 | Park et al. . | |
| 5,345,002 | 9/1994 | Song et al. | 568/793 |
| 5,350,817 | 9/1994 | Winter et al. | 526/119 |
| 5,366,647 | 11/1994 | Gutierrez et al. | 252/51.5 A |
| 5,369,136 | 11/1994 | Park et al. . | |
| 5,370,229 | 12/1994 | Kroeckel et al. . | |
| 5,376,428 | 12/1994 | Palazzotto et al. | 428/143 |
| 5,380,810 | 1/1995 | Lai et al. . | |
| 5,382,698 | 1/1995 | Song et al. | 568/3 |
| 5,385,972 | 1/1995 | Yamamoto et al. | 524/579 |
| 5,387,620 | 2/1995 | Park et al. . | |
| 5,391,629 | 2/1995 | Turner et al. | 525/268 |
| 5,407,965 | 4/1995 | Park et al. . | |
| 5,408,004 | 4/1995 | Lai et al. . | |

SILANE-GRAFTED MATERIALS FOR SOLID AND FOAM APPLICATIONS

CROSS REFERENCE TO RELATED APPLICATIONS

This application is a continuation-in-part of U.S. Ser. No. 08/308,801, filed Sep. 19, 1994, now abadoned.

BACKGROUND OF THE INVENTION

The invention relates to the silane-grafting of polyolefin materials to enhance the properties of the materials.

Current art for the production of cross-linked polyolefin foam structures involves the use of conventional high-pressure reactor-produced, low density polyethylene (LDPE). LDPE is comprised of a wide-ranging distribution of branch lengths, best characterized as "long- but variable-chain branching", and a molecular weight distribution (Mw/Mn) which is generally greater than about 3.5. LDPE resin densities, which directly relate to the resulting bulk property stiffness, typically range between 0.915 g cm$^{-3}$ to about 0.930 g cm$^{-3}$, thus limiting the degree of mechanical flexibility in foam structures thereof since the lower limit of secant module for LDPE is about 20 ksi. While processability of LDPE is quite good, the physical properties, in particular the tensile strength, low-temperature flexibility and toughness, are less than would be obtained from a linear low density polyethylene (LLDPE), due in part to the substantially non-linear nature of LDPE and the profusion of "long-chain branches."

Conventional linear low density polyethylene (LLDPE) exhibits physical properties which are superior to that of LDPE at about the same range of resin densities, but show somewhat higher secant module and are difficult to process, resulting in foams with poor cell structure and higher than desired foam structure densities. LLDPE resins, produced by conventional Ziegler transition metal catalysts in the copolymerization of ethylene with one or more alpha-unsaturated monomers, exhibit considerably narrower molecular weight distributions than LDPE, higher molecular weights, and typically only about 15–20 "short-chain branches" per 1000 carbon atoms. Melt-processing in general, and foam processing in particular, are greatly enhanced by the ability of the resin to "shear-thin" or demonstrate a strong, inverse dependency of melt viscosity toward shear rate. "Shear thinning" increases with the degree of branching, which is exemplified in the relative shear-insensitivity of LLDPE and particularly HDPE and resulting foam processing difficulty. Commercially-available LLDPE resins with densities below about 0.910 g/cc are unavailable, thus further limiting the flexibility of foam structures thereof.

Very low density polyethylene (VLDPE) is a special subset of LLDPE wherein an even greater number of "short-chain branches" (ca. 30–50 per 1000 carbon atoms) are effected by appropriate level of comonomer to result in much lower resin densities than LLDPE, e.g. 0.88 g cm$^{-3}$ to 0.91 g cm$^{-3}$. These materials thus exhibit greater flexibility than LLDPE. However, generally with conventional linear polyolefins, the greater the number of "short-chain branches," the lower the resulting resin density, but also the shorter the length of the molecular backbone. The presence of shorter molecular backbones, with greater comonomer content therein, prematurely leads to a phenomena known as "melt fracture," which is manifested as the onset of perturbations at the surface of an extrudate with increasing shear rate, resulting in loss of control of the quality of such profiled, extrudable materials.

Certain other undesirable structural features accompany efforts to increase "short-chain branching" while employing conventional linear polyethylene technology, such as an increase in the non-uniformity of the distribution of branches on the molecular backbone. Additionally, conventional linear polyethylene technology leads to a distribution of molecular weights, with a greater propensity of incorporation of the alpha-unsaturated comonomer into the lower molecular weight fractions, thereby leading to melt fracture. Also, as a result of this non-uniformity of molecular weights and distribution of comonomeric species within and among the distribution thereof, linear polyolefins exhibit less than optimal performance in various parametric standards such as toughness, particularly at low temperatures, and stability of extrusion, particularly at high rates.

Many of the above noted deficiencies in the foamable polyolefin art could be satisfied through the use of a linear olefinic resin which is essentially free of "long-chain branches", and which has a molecular weight that is sufficiently high to preclude melt-fracture, a narrow molecular weight distribution, a considerable melt-viscosity/shear rate sensitivity and a full range of resin densities. Such a linear polyolefin would exhibit the preferred balance of physical properties, would exhibit good toughness and processability, and would be available in a range of resin flexibilities. It is thus an object of this invention to provide a linear olefinic resin which possesses these characteristics.

Various catalysts are known to the art of polyolefin foams. "Metallocenes" are one class of highly active olefin catalysts, well known in the art of preparation of polyethylene and copolymers of ethylene and alpha-unsaturated olefin monomers. U.S. Pat. No. 4,937,299 (Ewen et al.) teaches that the structure of the metallocene catalyst includes an alumoxane which is formed when water reacts with trialkyl aluminum with the release of methane, which complexes therein with the metallocene compound to form the active catalyst. These catalysts, particularly those based on group IV B transition metals such as zirconium, titanium and hafnium, show extremely high activity in ethylene polymerization.

Metallocene catalysts have great versatility in that, by manipulation of process conditions such as catalyst composition and reactor conditions, they can be made to provide polyolefins with controlled molecular weights from as low as about 200 to about 1 million or higher. Exemplary of the latter case is ultra-high molecular weight linear polyethylene. At the same time, the molecular weight distribution of the polymers thereof can be controlled from extremely narrow to extremely broad, i.e. from less than 2 to greater than 8.

Metallocene catalysts are particularly advantageous in the preparation of copolymers of ethylene and one or more alpha-unsaturated olefin comonomers to provide highly random distributions of comonomer within each and every molecular backbone, while separately controlling the average molecular weight as well as the distribution of molecular weights about the average. It is thus an object of the present invention to use the versatility of metallocene catalysts to produce linear olefinic resins having the aforementioned properties.

These and other objects are realized by the present invention, as disclosed herein.

SUMMARY OF THE INVENTION

In one aspect, the invention features a polyolefin article including a silane-grafted olefin copolymer resin having a silane-graft content of up to 6 percent, more preferably 0.1 to 2 percent. The olefin copolymer resin has a density between about 0.86 and about 0.96 g cm$^{-3}$, a molecular weight distribution between about 1.5 and about 3.5, a melt index in the range of about 0.5 dg/min to about 100 dg/min, and a composition distribution breadth index greater than about 45 percent. In preferred embodiments, the olefin copolymer resin is a polyethylene, a copolymer of ethylene and a C3–C20 alpha-olefin, a polypropylene, or a copolymer of ethylene, a C3–C20 alpha-olefin and a C4–C20 diene. The silane includes a vinyl silane having a C2 to C10 alkoxy group. In preferred embodiments, the silane includes a vinyl silane having 2 or 3 hydrolyzable groups. Preferably, the hydrolyzable groups are C2–C10 alkoxy groups. Most preferably, the silane includes vinyl triethoxysilane. In foamed polyolefin articles, the silane includes a vinyl silane having a C1 to C10 alkoxy group.

In preferred embodiments, the article includes a partially cross-linked polyolefin blend which includes the olefin copolymer resin.

Preferably, the article has a gel content of between 10 and 100 percent. The polymer blend can include between about 5 and 95 weight percent of the olefin copolymer resin.

In preferred embodiments, the polymer blend includes a copolymer including ethylene and propylene, an ethylene-propylene-diene monomer terpolymer, an ethylene-vinyl acetate copolymer, an ethylene-maleic anhydride copolymer, an ethylene-ethyl acetate copolymer, a low density polyethylene, a linear low density polyethylene, a medium density polyethylene, a high density polyethylene, or a polypropylene. The polyolefin blend can be partially silane-grafted.

In preferred embodiments, the silane can further include an alkyl trialkoxy silane, where the alkyl is a C1 to C20 group and the alkoxy is a C1 to C10 group.

In preferred embodiments, the article is foamed. The foamed article can including a cell nucleating agent and a gas exchange additive. Preferably, the foamed polyolefin blend is in the form of a sheet, plank, laminated plank, bead, or extruded profile. The preferred foam has an average foam density between 1.0 and 50 pounds per cubic foot. The foam can be a closed cell foam or an open cell foam.

In another aspect, the invention features a method of making a polymer article including the steps of providing a mixture including silane-grafted olefin copolymer resin and a foaming agent and cross-linking the polymer mixture, where the silane includes a vinyl silane having a C2 to C10 alkoxy group.

In preferred embodiments, the method includes the step of silane-grafting a portion of the mixture.

In other preferred embodiments, the method includes the step of expanding the polymer blend to form a foam. The polymer blend can be cross-linked prior to the expanding step. Alternatively, the cross-linking can occur after the expanding step. The cross-linking can occur by exposing the polymer mixture to moisture, reacting the polymer blend with a peroxide, or, at times, both.

In preferred embodiments, the mixture is extruded.

In other preferred embodiments, the expanding step includes compression molding the polymer mixture at increased temperature and pressure. The compression molding can include the steps of pressing the polymer mixture using a high tonnage press at a temperature of between 275° and 320° F. and a pressure of between 250 and 2500 psi for between 20 and 90 minutes followed by heating the polymer mixture at a temperature between 300° and 380° F.

In other preferred embodiments, the method includes applying a coating to the polymer article.

According to one embodiment of the present invention, there is provided a method of producing a foamed, cross-linked structure comprising the steps of: (a) providing a polymeric composition which is composed of at least 5% and up to 100% of a polyolefin copolymer, wherein said copolymer is produced from ethylene and one or more alpha-unsaturated ethylenic monomers, and is substantially free of "long-chain branching"; (b) inducing the cross-linking reaction; and (c) expanding the composition. In this embodiment, the polyolefin copolymer comprises a polymer selected from the group of ethylene polymerized with at least one comonomer selected from the group consisting of at least one alpha-unsaturated C3 to C20 comonomer and optionally at least one C3 to C20 polyene, has a resin density in the range of about 0.86 g cm$^{-3}$ to about 0.96 g cm$^{-3}$, a melt index in the range of about 0.5 dg/min to about 100 dg/min, a molecular weight distribution in the range of from about 1.5 to about 3.5, and a composition distribution breadth index greater than about 45 percent.

According to another embodiment of the present invention, there is provided a method of producing a foamed, cross-linked structure comprising the steps of: (a) providing a polymeric composition which comprises at least 5% and up to 100% of a polyolefin copolymer, wherein said copolymer is produced from ethylene and one or more alpha-unsaturated ethylenic monomers and is substantially free of branch lengths exceeding 20 carbon atoms; (b) inducing the cross-linking reaction; and (c) expanding the composition.

The expansion of the composition may be accomplished by use of a decomposable foaming agent, or by use of a physically-expanding, volatile foaming agent. The cross-linking may be effected by reacting the foam composition with a silane cross-linking agent, which may be subsequently combined with other polymeric resins, and then effecting the cross-linking by exposing the mixture to moisture, possibly with the use of a suitable silanol condensation catalyst.

In other embodiments, the cross-linking of the polymeric composition is effected by free-radical initiators, or by irradiation.

In the preferred embodiment, the cross-linked foam structures exhibit 70% or greater closed-cells, and densities greater than about 0.7 lb/cu.ft. but less than about 22 lb/cu.ft.

Polyolefinic foams can be produced either through the use of physical or chemical foaming agents.

The present invention also contemplates the addition of other resins, particulate and fibrous fillers, antioxidants, ultra-violet and thermal stabilizers, pigments and colorants, cell-growth nucleants such as talc, cell-structure stabilizers such as fatty acids or amides, property-modifiers, processing aids, additives, catalysts to accelerate cross-linking and other reactions, and other materials which will be obvious to one skilled in the art.

A slow silane is a silane cross-linking agent that hydrolyzes (i.e., cross-links) more slowly than VTMOS. It can take a longer time to cure a slow silane-grafted material than a VTMOS grafted material.

The invention can have one or more of the following advantages. The enhancement in the properties of slow silane-grafted polyolefinic materials prepared by the methods of the invention can be demonstrated by, for example, improvement in the cross-linking behavior of the polymers, improvement in the processing characteristics of the foam materials, and improvement in the surface bonding properties of the polymer materials.

DETAILED DESCRIPTION

Figure 1:
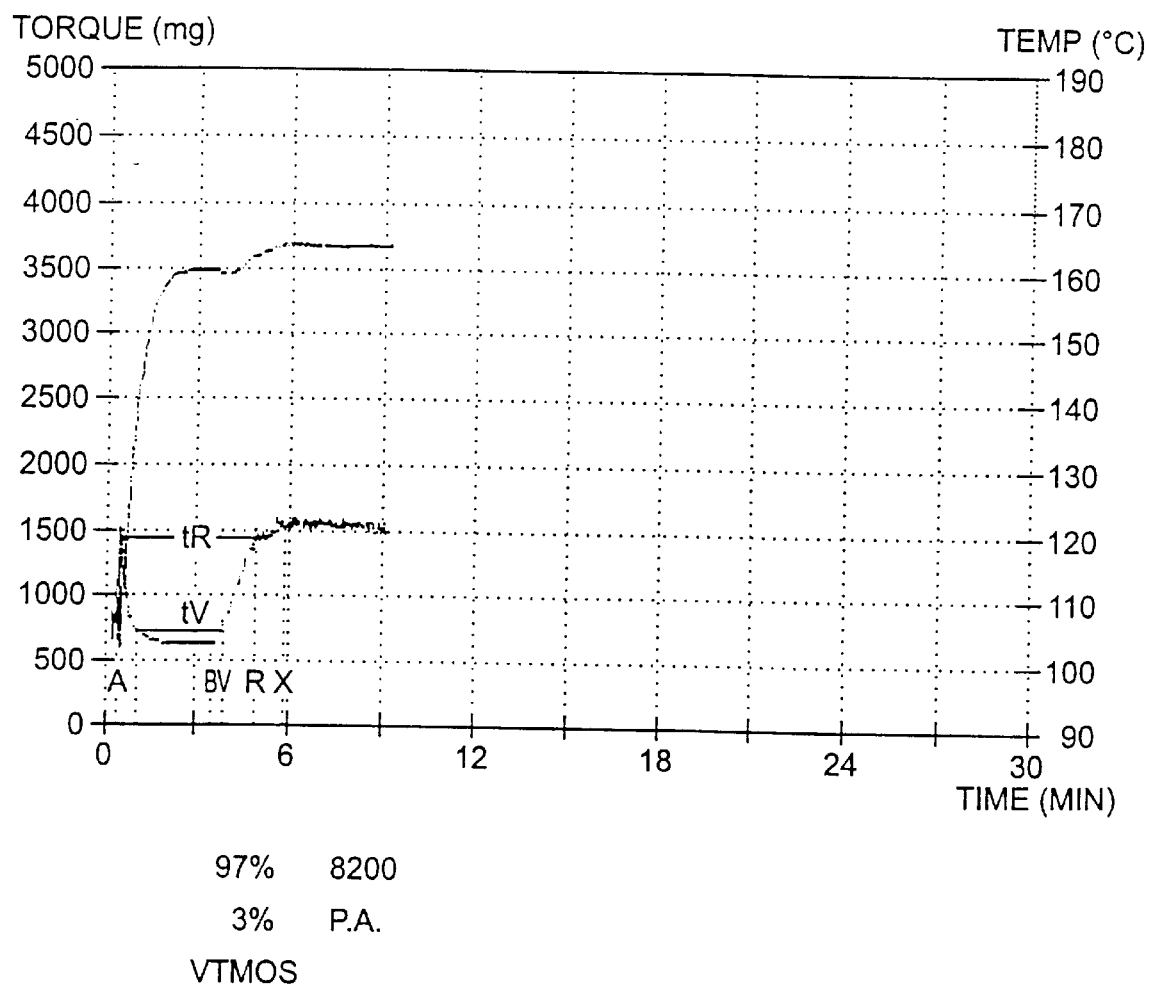
FIG. 1 is a graph depicting the cross-linking rate, as indicated by an increase in torque in the mixer over time, of an essentially linear olefin copolymer grafted with VTMOS at 163° C.

Foaming requires that polyolefins be capable of being expanded and strong enough to sustain and contain gases in a homogeneous group of cells (bubbles). Cross-linking of polyolefins makes it possible to use previously unsuitable polyolefins in foaming applications. The previously unsuitable polyolefins included, but were not limited to, many types and grades of LDPE, LLDPE, VLDPE, HDPE, EVA, PP, EVOH, EPDM, EPR, and blends thereof. Cross-linking of polyolefinic materials can be effected through several known methods including: (1) use of free radicals provided through the use of organic peroxides or electron beam irradiation; (2) sulfur cross-linking in standard EPDM (rubber) curing; (3) and moisture curing of silane-grafted materials. The cross-linking methods can be combined in a co-cure system or can be used individually to make the polymer compositions foamable.

The cross-linking of the polyolefinic materials aids in the formation of desirable foams and also leads to the improvement of the ultimate physical properties of the materials. The level of cross-linking in the material can be related to the physical properties of the foam. The silane-grafting cross-linking mechanism is particularly advantageous because it provides a change in the polymer rheology by producing a new polymer structure having improved physical properties.

Silane-grafting can be used to enhance the properties of polymeric materials in all current types of polyolefinic foams produced such as, for example, physically blown continuous sheet materials, physically blown block (bun) materials, chemically blown continuous sheet materials, and chemically blown block (bun) materials. The foamed materials can be made by continuous extrusion methods or by a batch mixing processes with subsequent calendaring.

Silane-grafting cross-linking technology provides for the grafting of a polyolefinic polymer with a hydrolyzable silane that is subsequently hydrolyzed to form cross-links between grafted polymer chains. The cross-linking can take place before or after expanding the material as a foam. Although previous silane-grafted polyolefins required the presence of a catalyst to have effective cross-linking, the catalyst is no longer required in systems that use VTEOS as the hydrolyzable silane. In particular, the cross-links are formed during and after expanding the foam in the present systems. By adjusting the levels of cross-linking and the chemical nature of the hydrolyzable groups, the rates of cross-linking and foaming can be controlled in order to provide foams having enhanced physical properties.

The present invention is a unique class of cross-linked, polyolefin foam compositions which, by virtue of the catalyst technology and methods utilized in their preparation from monomeric alpha-olefins, manifest a molecular structure that greatly facilitates processing and exhibits superior physical properties for cellular articles made therefrom.

There are a number of structural variables in polyolefin copolymers which effect both the processing characteristics as well as the ultimate physical properties of the polymer, and which thus directly influence the processing and ultimate properties of cross-linked compositions thereof. Two of the most important are the uniformity of molecular weight and the uniformity of distribution of comonomers within each, and among all, of the polymeric molecular backbones.

The uniformity of both molecular weight and comonomer distributions influences the toughness of polymeric materials and articles made therefrom, particularly at low temperatures. Likewise, these factors also influence the stability of melt processability, particularly at high shear rates, as well as the level and balance of other physical properties achievable in articles formed thereof. Additionally, the type and amount of comonomer employed along with ethylene in the polymerization, the average molecular weight, melt index and specific gravity all effect the properties of the subject polyolefin copolymer. The intrinsic properties of the subject polyolefin copolymers along with the relative amount of the copolymers and type and amount of additional polymeric resins are a major factor contributing toward the superiority of the compositions.

Polyolefin resins of this invention possess a narrow molecular weight distribution and are "essentially linear," although they contain the desired level of uniformly distributed, highly controlled "short-chain branching". As a result of this combination, the resins exhibit a strength and toughness approaching that of linear low density polyethylenes, but have processability similar to high pressure, reactor produced low density polyethylene. These "essentially linear" polyolefin resins are characterized by a resin density in the range of about 0.86 g cm$^{-3}$ to about 0.96 g cm$^{-3}$, a melt index in the range of about 0.5 dg/min to about 100 dg/min, a molecular weight distribution in the range of from about 1.5 to about 3.5, and a composition distribution breadth index greater than about 45 percent.

As used throughout this disclosure, the term "linear polyolefin" refers to an olefin polymer lacking "long-chain branching," as exemplified by the conventionally produced linear low density polyethylene or linear high density polyethylene polymers made using Ziegler polymerization processes and disclosed, for example, in U.S. Pat. No. 4,076,698 and U.S. Pat. No. 3,645,992. The term does not refer to high pressure, reactor produced branched polyethylenes, or to copolymers of ethylene and vinyl acetate, vinyl alcohol, ethyl acrylate, methyl acrylate, acrylic acid, or the like which are made using high-pressure technology and which are known to have numerous long-chain branches.

As used throughout this disclosure, the term "essentially linear" refers to a "linear polymer" with a molecular backbone which is virtually absent of "long-chain branching," to the extent that less than about 0.01 "long-chain branches" per one-thousand carbon atoms are manifested thereof. Similarly, as used throughout this disclosure, the phrase "substantially free from long-chain branching" refers to a "linear polymer" with a molecular backbone with less than about 0.01 "long-chain branches" per one-thousand carbon atoms manifested thereof.

As used throughout this disclosure, the term "long chain branching" refers to a molecular branch of a molecular backbone of at least 6 carbon atoms, above which the length cannot be distinguished using 13C nuclear magnetic resonance (NMR) spectroscopy. The long chain branch can be as long as about the same length as the molecular backbone. Methods of quantifying long chain branching by use of 13C NMR spectroscopy were described by Randall (Rev. Macromol. Chem. Phys., C29 (2&3), p. 285–297).

As used throughout this disclosure, the term "short-chain branching" is defined as a molecular branch of a molecular backbone of less than 6 carbon atoms which, as described above, would be distinguishable by 13C NMR spectroscopic methods.

As used throughout this disclosure, the term "copolymer" refers to material resulting from the polymerization of two or more monomeric species, and specifically encompasses terpolymers (e.g., materials resulting from the polymerization of three or more monomeric species), sesquipolymers, and greater combinations of monomeric species thereof.

The densities, or specific gravities, of the resins herein disclosed were measured using ASTM D-792 methods, except that they were additionally conditioned by holding them for 48 hours at ambient temperature (23° C.) prior to the density measurements. The essentially linear polyolefin resins disclosed in this invention are generally characterized by a resin density in the range of about 0.86 g cm$^{-3}$ to about 0.96 g cm$^{-3}$, preferably of about 0.86 g cm$^{-3}$ to about 0.91 g cm$^{-3}$.

The "Melt Index" (MI) is a measurement of processability under low shear rate conditions, in accordance with ASTM D-1238 Condition E (190° C./2.16 kg). For the essentially linear polyolefins disclosed in this invention, the MI is generally in the range of about 0.2 dg/min to about 100 dg/min. Preferably, the MI is in the range of about 1 dg/min to about 10 dg/min, and most preferably in the range of about 2 dg/min to about 8 dg/min.

The molecular weight distribution (MWD or Mw/Mn) is a parameter determined by use of gel permeation chromatography with multiple mixed-porosity columns, comparing elution volumes of the unknown to those of narrow MWD polystyrene standards. The correspondence is accomplished by using the appropriate Mark-Houwink coefficients for the polystyrene standard and the polyethylene unknown, with procedures as described by Williams and Word in Journal of Polymer Science, Polymer Letters, Vol. 6, (621) 1968, incorporated herein by reference.

The Composition Distribution Breadth Index (CDBI) is a measurement of the uniformity of distribution of comonomer to the copolymer molecules, and is determined by the technique of Temperature Rising Elution Fractionation (TREF), as described in, for example, Wild et. al., J. Poly. Sci., Poly. Phys. Phys. Ed., Vol. 20, p. 441 (1982). This attribute relates to polymer crystallizability, optical properties, toughness and many other important performance characteristics of compositions of the present art. For example, a polyolefin resin of high density with a high CDBI but equal comonomer content and other characteristics, enhancing toughness in objects of the present invention. The benefits to the discovery of the subject invention that accrue through the specific use of essentially linear polyolefin copolymers of narrow composition distribution are elucidated later in the examples.

As used herein, the CDBI is defined as the weight percent of the copolymer molecules having a comonomer content within 50% (i.e. +/−50%) of the median total molar comonomer content. Unless otherwise indicated, terms such as "comonomer content," "average comonomer content" and the like refer to the bulk comonomer content of the indicated interpolymer blend, blend component or fraction on a molar basis. For reference, the CDBI of linear poly(ethylene), which is absent of comonomer, is defined to be 100%. CDBI determination clearly distinguishes the low density polyolefins of this art, which show narrow composition distribution as assessed by CDBI values generally above 70%, from very low density polyolefin copolymers produced by conventional linear catalyst technology, which have a broad composition distribution as assessed by CDBI values generally less than 55%. The CDBI of the essentially linear polyolefin copolymers disclosed in this invention is generally about 45% or higher. Preferably, the CDBI is about 50% or higher. More preferably, the CDBI is about 60% or higher, and most preferably, about 70% or higher.

The "essentially linear" polyolefin copolymers of the present invention are preferably produced through the use of metallocene catalysts in accordance with any suitable polymerization process, including gas phase polymerization, slurry polymerization, and high pressure polymerization. However, the methods of the present invention are not restricted to the use of metallocene catalysts. Preferably, the "essentially linear" polyolefins used in the foam compositions of the present invention are produced by gas-phase polymerization. Gas phase polymerization processes generally utilize super-atmospheric pressures and temperatures in the range of about 50° C. to about 120° C. Such polymerization can be performed in a stirred or fluidized bed of catalyst and product particles in a pressurized vessel adapted to facilitate the separation of product particles from unreacted gases therein. Maintenance of temperature may be accomplished by circulation of ethylene, comonomer, hydrogen or inert gas such as nitrogen. Triethylaluminum may be added as needed as a scavenger of water, oxygen, and other undesirable impurities. Polymer produced thereof may be withdrawn continuously or semi-continuously at a rate necessary to maintain a constant product inventory in the reactor.

Subsequent to polymerization and deactivation of the catalyst, the product copolymer may be recovered by any suitable means. In commercial practice, the polymeric product can be recovered directly from the gas phase reactor, freed of residual monomer with a nitrogen purge, and used without further deactivation or catalyst removal.

The essentially linear polyolefin copolymers of the present invention may also be produced using a high pressure process by polymerizing ethylene in combination with the other desired monomers in the presence of the metallocene alumoxane catalyst system. Critical to this method is that the polymerization temperature be above 120° C., but below the decomposition temperature of the product, and that the polymerization pressure be above about 500 kg/cm$^2$. In certain instances wherein the molecular weight of the product must be controlled, any of the suitable techniques known in the art for control of molecular weight, such as the use of hydrogen or reactor temperature, may be employed to effect such control therein.

The essentially linear olefinic copolymers of the present invention are preferably derived from ethylene polymerized with at least one comonomer selected from the group consisting of at least one alpha-unsaturated C3 to C20 olefin comonomer, and optionally one or more C3 to C20 polyene. The types of comonomers selected to produce the essentially linear polymer utilized in the present invention will depend upon economics and the desired end-use of the resultant cross-linked foam structure.

Generally, the alpha-unsaturated olefin comonomers suitable for use in the present invention contain in the range of about 3 to about 20 carbon atoms. Preferably, the alpha-unsaturated olefins contain in the range of about 3 to about 16 carbon atoms, and most preferably in the range of about 3 to about 8 carbon atoms. Illustrative, non-limiting examples of such alpha-unsaturated olefin comonomers used as copolymers with ethylene include propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinyl cyclohexene, vinylbenzocyclobutane and the like.

Generally, the polyenes used in the present invention contain about 3 to about 20 carbon atoms. Preferably, the polyenes contain about 4 to about 20 carbon atoms, and most preferably about 4 to about 15 carbon atoms. Preferably, the polyene is a straight-chain, branched chain or cyclic hydrocarbon diene having from about 3 to about 20 carbon atoms, more preferably from about 4 to about 15 carbon atoms, and most preferably from about 6 to about 15 carbon atoms. It is also preferred that the diene is non-conjugated. Illustrative non-limiting examples of such dienes include 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene and dicyclopentadiene. Especially preferred is 1,4-hexadiene.

Preferably, the polymeric foam composition of the present invention will comprise either ethylene/alpha-unsaturated olefin copolymers or ethylene/alpha-unsaturated olefin/diene terpolymers. Most preferably, the essentially linear copolymer will be ethylene/1-butene or ethylene/1-hexene.

The comonomer content of the olefin copolymers utilized in the present invention is typically in the range of about 1 percent to about 32 percent (based on the total moles of monomer), preferably in the range of about 2 percent to about 26 percent, and most preferably in the range of about 6 percent to about 25 percent.

The preferred olefin copolymers used in making the products of the present invention are produced commercially by Exxon Chemical Company, Baytown, Tex., under the tradename Exact™, and include Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, Exact™ 4041, Exact™ 4049, Exact™ 4050, Exact™ 4051, Exact™ 5008, and Exact™ 8002. Other olefin copolymers are available commercially from Dow Plastics, Midland, Mich. (or DuPont/Dow), under the tradenames Engage™ and Affinity™, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, and D8130 (or XU583-00-01). Most preferably, the essentially linear olefin copolymers are selected from the group consisting of Exact™ 3024, Exact™ 3031, Exact™ 4049, PL1845, EG8200, and EG8180. However, one skilled in the art will appreciate that other resins satisfying the requirements of an absence of long-chain branching, the range of molecular weight distributions, the range of composition distribution breadth indices, the range of resin densities, and the range of melt flow indices, are also available and may be used without departing from the scope of the invention.

While the aforementioned essentially linear olefin copolymers are most preferable as the compositions of this invention, the addition of other polymers or resins to the composition, either prior or subsequent to grafting or cross-linking, can result in certain advantages in the economic, physical and handling characteristics of the cellular articles made in accordance with this invention. Examples of the polymers and resins which may be advantageously added include low density polyethylene, high density polyethylene, linear low density polyethylene, medium density polyethylene, polypropylene, ethylene propylene rubber, ethylene propylene diene monomer terpolymer, polystyrene, polyvinyl chloride, polyamides, polacrylics, cellulosics, polyesters, and polyhalocarbons. Copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, methyl methacrylate, acrylic acid, and methacrylic acid may also be used. Various polymers and resins which find wide application in peroxide-cured or vulcanized rubber articles may also be added, such as polychloroprene, polybutadiene, polyisoprene, poly(isobutylene), nitrile-butadiene rubber, styrene-butadiene rubber, chlorinated polyethylene, chlorosulfonated polyethylene, epichlorohydrin rubber, polyacrylates, and butyl or halo-butyl rubbers. Other resins are also possible, as will be apparent to one skilled in the art, including blends of the above materials. Any or all of the additional polymers or resins may be advantageously grafted or cross-linked, in concert or separately, within the scope of the object of this invention.

Preferred resins, to be added to the object copolymer of this invention, include polypropylene, other essentially linear olefin copolymers, low density polyethylene (LDPE), high density polyethylene (HDPE), linear low density polyethylene (LLDPE), ethylene-propylene rubber, ethylene-propylene-diene monomer terpolymer (EPDM), polystyrene, polyvinylchloride (PVC), polyamides, polyacrylates, celluloses, polyesters, polyhalocarbons, and copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, acrylic acid, or methacrylic acid. The polymer blends can also include rubber materials such as polychloroprene, polybutadiene, polyisoprene, polyisobutylene, nitrile-butadiene rubber, styrene-butadiene rubber, chlorinated polyethylene, chlorosulfonated polyethylene, epichlorohydrin rubber, polyacrylates, butyl rubber, or halobutyl rubber. The rubber material can be peroxide-cured or vulcanized. Preferred resins include single-site initiated polyolefins, LDPE, LLDPE, polypropylene, polystyrene, or ethylene copolymers such as ethylene-vinyl acetate copolymer (EVA), or ethylene-ethyl acrylate copolymer (EEA). The preferred level of the essentially linear polyolefin copolymer, as a percentage of total polymeric resin, preferably ranges from about 5% to about 100%, more preferably from about 10% to about 60%, and most preferably from about 10% to about 40%.

The silane-grafted material can further include EPDM resins or essentially linear EPDM (i.e., prepared with a metallocene catalyst). The silane-grafted EPDM resins can be cross-linked by the slow silane mechanism or the co-cure system. When foamed, the silane-grafted resins that include an EPDM resin do not need to include oil to produce a soft foam.

The slow silane-grafted materials include essentially linear polyolefin resins (i.e., essentially linear olefin copolymers). The slow silane-grafted materials can be nearly 100% essentially linear olefin resins, or blends of the essentially linear polyolefin resins with other materials such EPDM, PP, EVA, EMA, EEA, or other related resins. The slow silane-grafted materials preferably have silane contents above about 0.6 percent. At these levels of silane, the faster silanes (i.e., VTMOS), could not be extruded without experiencing processing complications due to a reaction in the grafting line or extruder. The slow silane can be mixed or extruded without detrimental cross-linking reactions in the mixer or extruder that would render it unusable for foaming.

The composition can also include polypropylene resins. The preferred polypropylene resins are Rexene Rexflex FPO D1700CS6, a flexible polypropylene, and Himont PP 632. Polymer blends including about 20 to 80 percent polypropylene with an essentially linear polyethylene resin have improved temperature stability. Silane-grafted materials that include a flexible polypropylene with the essentially linear polyolefin resin can be processed to yield a flexible material instead of a rigid, board-like material that is typical of polypropylene-containing materials. The higher grafting levels in the slow silane-grafted materials can make the polymer combinations more compatible for blending with higher temperature resistant polypropylene resins than previous silane-grafted materials.

The slow silane-grafted material avoids previous difficulties that were encountered in foaming materials that cross-linked too rapidly, such as materials that include EPDM or EPR resins. These materials have a tendency to cross-link too rapidly under ordinary conditions which causes damage to the material during expansion which can include, for example, cracking, forming voids or rounded corners, and incomplete expansion.

Slow silane-grafted materials that include polypropylene and soft essentially linear polyethylene resins or ethylene vinyl acetate resins (EVA) can be used to produce thin gauge foams (e.g., 0.020" to ⅛" thick) for use as foam adhesive backed tapes which exhibit high thermal stabilities. A lower cost silane-grafted polypropylene blend based foam can suitably replace higher cost acrylic foam tapes having high temperature stabilities due equivalent performance at a lower cost. By including an EVA resin, lower density and thinner materials can be obtained that have the performance characteristics of non-EVA containing thicker gauge materials.

The cross-linking of the compositions useful in the practice of the present invention is preferably accomplished by the use of chemical cross-linking agents or high-energy radiation. Suitable methods of chemical cross-linking include the use of decomposable, free-radical generating species, or the use of silane-grafting, wherein the molecular backbone of the constituents of said composition are chemically reacted with a subsequently cross-linkable chemical species. In the latter case, the cross-link is appropriately effected by the use of warm, moist conditions subsequent to the grafting step, optionally with a suitable catalyst. Combinations of methods of cross-linking may be utilized to facilitate the degree of control and achieve the desired level of cross-linking.

Representative chemical cross-linking agents which are usefully employed herein include the organic peroxides, azido and vinyl functional silanes, multifunctional vinyl monomers, organo-titanates, organo-zirconates and p-quinone dioximes. The chemical cross-linking agent may be advantageously selected by reference to the processing temperature and permissible time at the desired event of said cross-linking reaction. That is to say, by selecting a chemical cross-linking agent which exhibits a half-life of between one minute and 60 minutes at the preferred temperature of the cross-linking event, the rate of cross-linking may be expeditiously induced with the required degree of control. The processing temperature and permissible time of the cross-linking event are often dictated by material handling requirements, for example proper conveyance of the composition through an extruder at reasonable rates thereof.

Suitable chemical cross-linking agents for the compositions of this invention include, but are not limited to, organic peroxides, preferably alkyl and aralkyl peroxides. Examples of such peroxides include:

dicumylperoxide, 2,5-dimethyl-2,5-di(t-butylperoxy) hexane, 1,1-bis(t-butylperoxy)-3,3,5-trimethylcyclohexane, 1,1-di-(t-butylperoxy)-cyclohexane, 2,2'-bis(t-butylperoxy) diisopropylbenzene, 4,4'-bis(t-butylperoxy) butylvalerate, t-butyl-perbenzoate, t-butylperterephthalate, and t-butyl peroxide. Most preferably, the cross-linking agent is dicumyl peroxide (Dicup) or 2,2'-bis(t-butylperoxy) diisopropylbenzene (Vulcup).

Chemically-cross-linked compositions are improved upon with the addition of multi-functional monomeric species, often referred to as "coagents." Illustrative, but non-limiting, examples of coagents suitable for use in chemical cross-linking in accordance with the present invention include di- and tri-allyl cyanurates and isocyanurates, alkyl di- and tri- acrylates and methacrylates, zinc-based dimethacrylates and diacrylates, and 1,2-polybutadiene resins.

The compositions used in compression molding are constrained by processing conditions. In particular, the higher temperatures are required to decompose certain organic peroxides to cross-link the polymers, such as Vulcup (2,2'-bis(tert-butylperoxy) diisopropylbenzene). The slow silane-grafted materials permit the use of high temperature activated organic peroxides (e.g., Vulcup) as the cross-linking peroxide for producing the thick (e.g., 1" to 4" thick) cross section compression molded foam materials by using a silane co-cure system. The high temperature activated organic peroxides such as Vulcup help eliminate unpleasant odors from the foamed materials due to chemical residuals of other peroxides in the materials. Without the use of the silane co-cure system, Vulcup could not be used as the cross-linking peroxide due to activation and half life temperature requirements in the primary step for cross-linking and foaming. The co-cure system makes it feasible to use Vulcup to reduce residual odor in the material.

Included in the cross-linking agents that may be used with the present invention are the azido-functional silanes of the general formula RR'SiY$_2$, in which R represents an azido-functional radical attached to silicon through a silicon-to-carbon bond and composed of carbon, hydrogen, optionally sulfur and oxygen; each Y represents a hydrolyzable organic radical; and R' represents a monovalent hydrocarbon radical or a hydrolyzable organic radical.

Azido-silane compounds graft onto an olefinic polymer though a nitrene insertion reaction. Cross-linking develops through hydrolysis of the silanes to silanols followed by condensation of silanols to siloxanes. The condensation of silanols to siloxanes is catalyzed by certain metal soap catalysts such as dibutyl tin dilaurate or butyl tin maleate and the like. Suitable azido-functional silanes include the tri-alkoxysilanes such as 2-(trimethoxylsilyl) ethyl phenyl sulfonyl azide and (triethoxysilyl) hexyl sulfonyl azide.

Other suitable silane cross-linking agents useful in the practice of the present invention include vinyl functional alkoxy silanes such as vinyl trimethoxy silane and vinyl triethoxy silane. These silane cross-linking agents may be represented by the general formula $RR'SiY_2$ in which R represents a vinyl functional radical attached to silicon through a silicon-carbon bond and composed of carbon, hydrogen, and optionally oxygen or nitrogen, each Y represents a hydrolyzable organic radical, and R' represents a hydrocarbon radical or Y.

Usually, free-radical initiating species, such as the organic peroxides described above, are incorporated along with the vinyl alkoxy silane to perform hydrogen extraction from the polymeric molecular backbone, whereupon the vinyl-functional silane may react and graft thereto. For reference, U.S. Pat. No. 3,646,155 presents further examples of such silanes. Subsequently, the grafted polymeric composition may be exposed to moisture to effect silanolysis condensation reactions therein to cross-link multiples of pendant silane grafts. Preferably, the composition contains a suitable condensation catalyst, and further is preferably shaped and formed into the desired profile or shape prior to contact with moisture. Most preferably, the silane cross-linking agent is vinyl trimethoxy silane (VTMOS), grafted on to the polymer backbone by the free-radical reaction which is initiated by 2,2'-bis(t-butylperoxy) diisopropylbenzene. The most preferred silanol condensation catalyst is dibutyl tin dilaurate, which greatly facilitates the cross-linking of pendent silane groups in the presence of moisture, preferably in hot water.

Methods of effecting the moisture induced cross-linking by condensation of silane grafts are widely disclosed in the art. Aside from the obvious exposure to hot water, preferably at a temperature above the softening point of the composition, hydrated inorganic compounds such as gypsum or other water-solvable or water-absorbing species may be incorporated into the composition which, upon heating the composition above the hydration-liberation temperature, advantageously release moisture to effect the condensation or silane pendent groups. Alternatively, moisture may be introduced directly into continuous melt-processing equipment, such as an extruder, either alone or in combination with one of the components of the composition, preferably at a downstream feeding port, optionally in combination with a physically expanding foaming agent. For example, U.S. Pat. No. 4,058,583 (Glander) discloses the injection of moist inert gasses, such as nitrogen, into a downstream port of a profile extruder, to both effect the expansion of silane-grafted compositions and the condensation of the silanes.

It is possible to cross-link a polyolefinic material that includes a single or multiple component silane-grafted material by hydrolysis. The silane-grafts can be a vinyl silane (e.g., VTEOS or other vinyl trialkoxy silane having C2 to C10 alkoxy groups) or a mixture of hydrolyzable silanes, one of which is VTEOS. Silane-grafts that include VTEOS allow for a higher level of cross-linking in the polyolefin material than was previously attainable for producing acceptable foams. The silane-graft can be a single slow silane, preferably VTEOS, or it can be a combination of VTEOS with an alkyl trialkoxy silanes having a C1 to C20 alkyl group and C1 to C10 alkoxy groups, such as the Dynasil 9116, which is hexadecyl trimethoxy silane available from Huls, Germany.

The use of slow silane-grafted material allows silane cross-linking to occur simultaneously with or subsequent to expanding the foam. For example, when the silane graft was only VTMOS, the cross-linking reactions occurred prior to foaming. By including VTEOS in the silane graft mixture, it is possible to control reaction rates (i.e., cross-linking and foaming rates) to produce materials with excellent physical properties. Due to the high reactivity rate of VTMOS, silane cross-linking levels in compositions grafted with VTMOS were limited to an average of about 0.4% and a maximum of about 0.6% due to processing difficulties. By using slower reacting silanes, such VTEOS or combinations of VTEOS with 9116, higher levels of silane grafting can be used to provide greater cross-linking in later processing steps while maintaining cross-linking uniformity throughout the foamed material. The slow silane graft, either alone or in combination with co-curing, leads to more uniform in density, cell structure, and physical properties in the foams, particularly for foams having thicker cross sections than prepared previously. The slow silane graft enhanced the ability to control uniformity in thick and thin cross sections of foams. The gain in uniformity by using VTEOS is preferential to the less uniform cross-linking obtained through the cross section of the foamed material that can occur when the silane graft is VTMOS. The non-uniformity has been observed in compression molded foamed materials (bun) and continuously foamed materials (extruded).

Typically the silane cross-linked polymer industry has focussed on faster processing cycles utilizing catalysts to affect rapid cross-linking of polyolefins (i.e., in wire and cable applications as described, for example, in Spenadel et al. U.S. Pat. No. 5,246,783). By utilizing a much slower cross-linking mechanism, higher silane levels can be obtained for cross-linking while maintaining the feasibility to produce foam, even low density foams. The slow silane-grafted materials permit producing articles such as wire and cable, profile extrusions, sheet extrusions, and sheet molding without requiring complete cross-linking until later in the process or after processing of material is complete to provide improvement in physical properties. In addition, high rate uncontrolled reactions are not acceptable in most foaming applications. In foaming, a controlled level of cross-linking is desirable and must be such that polymer rheology is controlled to yield sufficient melt strength in the process at the appropriate time to contain gas expansion forming a cellular structure.

By using large amounts of slow silanes relative to fast silanes, it is possible to essentially control the relative rates of cross-linking and foaming reactions. In this way, it is possible to the control of reaction rates during foaming, for example, by using long alkyl chain, high molecular weight silanes (such as Dynasil 9116) at levels from 1%–70% of the silane graft mixture. The delay of silane cross-linking step can be achieved by grafting mixtures of VTEOS and 9116.

It is possible to change the timing of the silane mechanism for cross-linking from prior to foaming to cross-linking simultaneously with foaming. It is also to partially cross-link the material, such that some cross-linking occurs to provide sufficient melt strength to allow foaming, but remainder of the cross-linking takes place after the material has been expanded into a foam. This approach leads to enhancement of physical properties of the foam.

The slow silane-grafted materials are sufficiently cross-linked to permit oven expansion without thermal quenching. The material remains at higher temperatures for longer periods of time, thus allowing residual volatile components to evaporate and otherwise be eliminated from the foamed material.

In compression molding, press or molding cycle time can be decreased due in part to the increased thermostability of the material.

Cold (i.e., room temperature) compounded slow silane-grafted material can be used in compression molding operations, therefore permitting pre-formed solid sheets of material to be shipped for later expansion at distant locations. This results in an economic benefit since the materials do not occupy increased volumes when transported. In addition, the pre-formed solid sheets can be extruded and calendared as individual sheets that can be layered (plied) to give structures having particular desired thickness. The plied structure can be cured and expanded in a press or a free expansion oven at a later time or remote location.

The densities of the materials obtained from the slow silane-grafted materials can range from foams of about 1 pcf up to solid materials. The high cross-linking levels that can be achieved correspond to gel contents of between 40 and 100 percent.

The slow silane-grafted materials can withstand long expansion cycles while maintaining dimensional stability and resisting overcuring, which can make the material brittle, and formation of voids, blisters, cracks, or splits. For example, the slow silane-grafted materials can withstand up to two hours of secondary expansion to promote complete curing at elevated temperatures between 320° F. and 400° F. The temperature stability depends, in part, on the level of cross-linking in the material.

The slow silane-grafted materials can have higher cross-link densities than previously described silane-grafted polyolefin foams. The higher cross-link densities lead to improved material properties, such as compression set, for example. The grafted material can be blended with other non-grafted polyolefin resins to decrease the overall cost of the materials without completely compromising the physical properties of the materials, although the physical properties are less than the 100% grafted material when blended. By slowing down the rate of cross-linking in the slow silane-grafted material, other polymers that are ordinarily incompatible with higher cross-linking levels can be blended with the silane-grafted material.

For moisture-cured polyolefin systems wherein long-term moisture stability is essential, U.S. Pat. No. 4,837,272 (Kelley) discloses methods of subsequently reacting the silane-grafted compositions with organo titanates to result in relatively moisture-stable adducts which readily cross-link in the presence of atmospheric moisture, even in absence of silanol condensation catalysts, to form the cross-linked structures.

Suitable methods for cross-linking olefinic compositions with high-energy, ionizing radiation involve the use of equipment which generates electrons, X-rays, Beta-rays or Gamma-rays. "Ionizing radiation" denotes electromagnetic waves or charged particles having the ability to interact directly or indirectly with a substance and consequently ionizing the substance. "High energy" is used to denote the relatively high potential of such radiation, necessary to uniformly and sufficiently penetrate the articles of the composition of this invention.

The most preferred method for cross-linking olefinic compositions through exposure to ionizing radiation is through the use of an electron-beam radiation source. The use of electron-beam radiation cross-linking results in fine cell structure and good surface quality, due in large part to the completion of cross-linking prior to the initiation of the expansion process step. Disadvantages of this method include the high cost of the equipment and the infeasibility of utilizing this method in a continuous manufacture of foam, since a single electron-beam source will only be economically supported by many continuous extrusion lines. Furthermore, certain polymers are susceptible to preferential chain scission or degradation instead of undergoing the desired cross-linking reaction.

Exposure of the compositions of the present invention to ionizing radiation may be accomplished at dosages in the range of about 0.1 to 40 Megarads, and preferably, at about 1 to 20 Megarads. U.S. Pat. No. 4,203,815 (Noda) discloses methods of exposing compositions to both high and low-energy ionizing radiation to effect improvements in surface quality, strength and subsequent heat-sealing or embossing processes. The amount of cross-linking may be appropriately controlled by the dosage of ionizing radiation, with preference dictated by the requirements of the ultimate application of the composition of this invention. optionally, coagents as described above may be incorporated into radiation-cross-linked compositions with advantageous results toward cure speed and uniformity of cross-linking.

More than one cross-linking mechanism can take place in the materials. By using slow silane-grafted polymers, a co-cross-linking mechanism (i.e., a co-cure or dual cure system) can be used to make a foam with enhanced properties. The polyolefinic materials can be combined with silane-grafted materials and an organic peroxide. By regulating levels and types of organic peroxide relative to silane levels, the relative rates of the steps of the co-cure can be varied to permit foaming of the polymer materials. The resulting materials have high cross-link levels and thus have improved physical properties.

Also, by adjusting the levels and types of cross-linking agent, it is possible to cross-link the material partially or completely before, during, or after expanding the material to make a foam. By adjusting the rates of the different cross-linking reactions, it is possible to achieve the desired levels of cross-linking without applying water, steam, the addition of water liberating materials, or some other outside source of moisture in a separate processing step. The delay of cross-linking can permit processing steps, such as, for example, laminating, thermoforming, molding, to take place prior to the final cross-linking step. Thus, by selecting cross-linking agents that cross-link under different conditions, the cross-linking and foaming operations can take place in a single or two step process.

Regardless of the method of cross-linking used, acceptable foamed articles may only be obtained by utilization of cross-linking over certain ranges of cross-linking density or level. Excessive cross-linking prior to foaming will render the foam composition too inelastic, resulting in less than optimal expansion and greater than optimal density for a given level of foaming agent. For processes which invoke cross-linking subsequent to expansion, excessive cross-linking would be economically inefficient. Less than optimal cross-linking may be detrimental to certain physical properties, such as compression set properties or thermal resistance.

One parameter for quantifying the degree of cross-linking is the "gel content" of the composition. The term "gel content," as used in this disclosure, is intended to describe the weight percent of an insoluble portion of the cross-linked product (on a dried basis) remaining after about 50 mg of a sample of the cross-linked product has been immersed in 25 ml of molecular-sieve dried xylene for 24 hours at 120° C. Process conditions should be utilized when providing for a cross-linked foam structure such that the resulting gel content is preferably in the range of about 5% to about 95%, more preferably in the range of about 10% to about 90%, and most preferably in the range of about 15% to about 85%.

The expanding medium, or foaming agents, useful in the practice of the present invention may be normally gaseous, liquid or solid compounds or elements, or mixtures thereof. In a general sense, these foaming agents may be characterized as either physically-expanding or chemically decomposing. Of the physically expanding foaming agents, the term "normally gaseous" is intended to mean that the expanding medium employed is a gas at the temperatures and pressures encountered during the preparation of the foamable compound, and that this medium may be introduced either in the gaseous or liquid state as convenience would dictate.

Included among the normally gaseous and liquid foaming agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane (CFC-12), trifluorochloromethane, trichloromonofluoromethane (CFC-11), ethyl fluoride, ethyl chloride, 2,2,2-trifluoro-1,1-dichloroethane (HCFC-123), 1,1,1-trichloroethane, difluorotetrachloroethane, 1,1-dichloro-1-fluoroethane (HCFC-141b), 1,1-difluoro-1-chloroethane (HCFC-142b), dichlorotetrafluoroethane (CFC-114), chlorotrifluoroethane, trichlorotrifluoroethane (CFC-113), 1-chloro-1,2,2,2-tetrafluoroethane (HCFC-124), 1,1-difluoroethane (HFC-152a), 1,1,1-trifluoroethane (HFC-143a), 1,1,1,2-tetrafluoroethane (HFC-134a), perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof. Other normally gaseous and liquid foaming agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as nitrogen, argon, neon or helium, can be used as foaming agents with satisfactory results. A physical foaming agent can be used to produce foam directly out of the extrusion die. The composition can optionally include chemical foaming agents for further expansion.

Solid, chemically decomposable foaming agents, which decompose at elevated temperatures to form gasses, can be used to expand the compositions of the invention. In general, the decomposable foaming agent will have a decomposition temperature (with the resulting liberation of gaseous material) from 130° C. to 350° C. Representative chemical foaming agents include azodicarbonamide, p,p'-oxybis (benzene) sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides as well as various acid/bicarbonate compounds which decompose when heated.

The slow silane-grafted materials can be foamed with chemical foaming agents, physical foaming agents, or combinations thereof. Materials with relatively high silane contents (high cross-link levels) can also be foamed. Higher density foams can be prepared, not only by varying the level of foaming agent added, but by the addition of fillers at contents that are difficult to incorporate without the assistance of the silane cross-linking and coupling mechanism.

The controlled cross-linking of the slow silane-grafted material permits better utilization of foaming agent in bun processes. Better utilization of the foaming agent provides for a reduction in fogging, as tested using the GM 9305 01/92 or ASTM D-523-94 protocols.

The preferred volatile liquid foaming agents include isobutane, difluoroethane or blends of the two. For decomposable solid foaming agents, azodicarbonamide is preferred, while for inert gasses, carbon dioxide is preferred.

The art of producing cross-linked foam structures is well known, especially for polyolefin compositions. The foam structure of the present invention may take any physical configuration known in the art, such as sheet, plank, other regular or irregular extruded profile, and regular or irregular molded bun stock. Exemplary of other useful forms of foamed or foamable objects known in the art include expandable or foamable particles, moldable foam particles, or beads, and articles formed by expansion and/or consolidation and fusing of such particles. Such foamable article or particle compositions may be cross-linked prior to expansion, such as for the process of free-radical initiated chemical cross-linking or ionizing radiation, or subsequent to expansion. cross-linking subsequent to expansion may be effected by exposure to chemical cross-linking agents or radiation or, when silane-grafted polymers are used, exposure to moisture optionally with a suitable silanolysis catalyst.

The slow silane provides the flexibility to cross-link partially or completely before a molding or expanding step. Alternatively, the cross-linking can occur simultaneously with or after the molding or expanding step. The silane-grafted polymer materials can be used to produce a foam which can be thermoformed and cross-linked in a subsequent step.

Slow silane-grafted materials can be used in molding processes to expand a particular form in mold from compound containing blowing agents and mixtures of cross-linking agents including slow silane grafts. The physical form of the slow silane-grafted materials prior to expansion can be in the shape of, for example, pellets, granules, chips, powder, fragments, or other small particulates which can enter small crevice areas of the mold. In this process, the foaming and cross-linking step can take place completely in the mold. Prior to the use of the slow silane-grafted materials, either the use of "faster" silanes alone or in conjunction with a peroxide did not permit the successful foaming and cross-linking in a mold cavity. Materials attempted would not bond together, nor successfully fill the entire mold, nor produce a smooth surface or skin of acceptable appearance. Alternatively, the molding process can occur in two steps. Here also, it was the use of the slow silane made it possible to delay cross-linking sufficiently to permit expansion of the material into the entire mold cavity. The "slow" silane-grafted material had sufficient time to foam into difficult to fill cracks and crevices without being so cross-linked as to prevent material flow. Also, there was sufficient delay in the cross-linking mechanism so as to permit the knitting together of particles or fragments of compounded material while foaming to fill the cavity. This delay also helped to improve the smoothness of the surface and skin. The molding process can be used to mold products such as, for example, automotive bumpers, packaging, footwear from the slow silane-grafted materials.

The silane-grafted materials can be used in injection molding, compression molding, transfer molding, or other types of molding operations.

Because of the controlled cross-linking capabilities that are obtained by using a slow silane graft, the silane-grafted materials can be used in other processes including, for example, rotational molding, slush molding, injection molding, the manufacture of solid sheet materials, the manufacture of cast films, and profile extrusions.

The slow silane-grafted material can be a thermoset foam or solid material. The thermoset materials can be fully cross-linked material to set their form.

Illustrative, but non-limiting, of methods of combining the various ingredients of the foamable composition include melt-blending, diffusion-limited imbibition, liquid-mixing, and the like, optionally with prior pulverization or other particle-size reduction of any or all ingredients. Melt-blending may be accomplished in a batchwise or continuous process, and is preferably carried out with temperature control. Furthermore, many suitable devices for melt-blending are known to the art, including those with single and multiple Archimedean-screw conveying barrels, high-shear "Banbury" type mixers, and other internal mixers. The object of such blending or mixing, by means and conditions which are appropriate to the physical processing characteristics of the components, is to provide therein a uniform mixture. One or more components may be introduced in a step-wise fashion, either later during an existing mixing operation, during a subsequent mixing operation or, as would be the case with an extruder, at one or more downstream locations into the barrel.

Expandable or foamable particles will have a foaming agent incorporated therein, such as a decomposable or physically expandable chemical blowing agent, so as to effect the expansion in a mold upon exposure of the composition to the appropriate conditions of heat and, optionally, the sudden release of pressure.

One preferred method of providing a sheet object of this invention involves silane-grafting, subsequent extrusion of a melt-blended profile, moisture-induced cross-linking of the profile, and finally oven-expansion of the profile. In the first step, a portion of the polymeric resins of the foam composition, which contains at least a portion of the essentially linear olefin copolymer of this disclosure, is melt-blended with a 20:1 mixture of vinyl trialkoxy silane and dicumyl peroxide in an extruder to effect the grafting of vinyl silane onto the polymers. This composition is extruded out of a multiple-strand die face, is chilled in water, and is then pelletized. In a subsequent step, the silane-grafted composition, along with ungrafted polymeric resins, chemically decomposable foaming agents, colorants, pigments, dibutyl tin dilaurate silanolysis catalyst, and, optionally, antioxidants and stabilizers, are melt-blended and extruded out of a sheet die and then passed through a three-roll stack to shape the profile to the correct gauge. The unexpanded sheet is then passed through a hot-water tank for sufficient time to effect the cross-linking, and is then passed through a gas-fired, hot-air oven to effect the decomposition of the foaming agent and expansion.

In another preferred method, the extruded profile from the above method, prior to exposure to hot water, is multiple-stacked and consolidated in a press within a suitable mold at a temperature below the decomposition of the foaming agent. Subsequently, it is exposed to hot water for sufficient time so as to effect the cross-linking via the silanolysis reaction. optionally, at this point the resulting preform is again placed into a high-pressure press within a suitable mold to initiate the foaming agent decomposition. Finally, the partially expanded preform is fully expanded within a hot-air forced-convection oven.

In an alternate procedure, a "Banbury" type mixer is used to fuse a mixture of the grafted composition and other ungrafted resins and components. The fused mixture is then molded into a preform, cross-linked by exposure to hot water, and then expanded as described above.

In yet another preferred method, a silane-grafted composition is melt-blended with a physically-expanding foaming agent such as isobutane, additional ungrafted polymeric resins, dibutyl tin dilaurate silanolysis catalyst, nucleants such as talc, and optionally antioxidants and stabilizers in a single-screw extruder. Optionally, a twin-screw extruder may be utilized. This composition is extruded out of a coat-hanger die whereupon the foaming agent expands and a fully-expanded foam sheet or plank results thereof. The net-shape sheet, plank, or board is the placed in humid storage for sufficient time to effect the cross-linking.

When a slow silane cross-linking agent is used, a chilling step after foaming is optional. Avoiding the chilling step is preferred since it maximizes utility of chemical blowing agents. Under conditions where foamed polyolefinic materials have previously been chilled to stop continuing reactions or to solidify the material in a fixed geometry (i.e., rectangular solid bun), the hot material can continue to co-cure and cross-link further while slowly cooling to room temperature. This impacts processing economics by permitting an energy savings by not requiring a cooling system (i.e., cooling water) to chill the foamed material.

Physically foamed materials can be prepared in a single stage extrusion operation with subsequent final or complete cross-linking of the foamed extrudate. Slow silane-grafted materials having high graft levels can be used in extrusion coating applications.

The slow silane-grafted polyolefinic materials can be cross-linked, optionally with a peroxide co-cure, to produce an open cell foam articles. Prior to the use of the slow silane system, polyolefinic materials other than EVA could not be cross-linked and foamed to produce and acceptable open cell foam. Utilizing the slow silane system, the rates of reaction for the cross-linking mechanism are controlled to permit regulation of the foaming reaction in order to produce open cell material. If a co-cure is used, a variety and combination of organic peroxides commonly used in the industry can be used to further cross-link the polymers. The controlled reaction rates described above allow for the use of single site catalyzed polyolefin resin at 100% or blends with other polyolefinic materials to make an open cell foams which can replace EVA, urethane, PVC, or other types of open cell foams.

Figure 2:
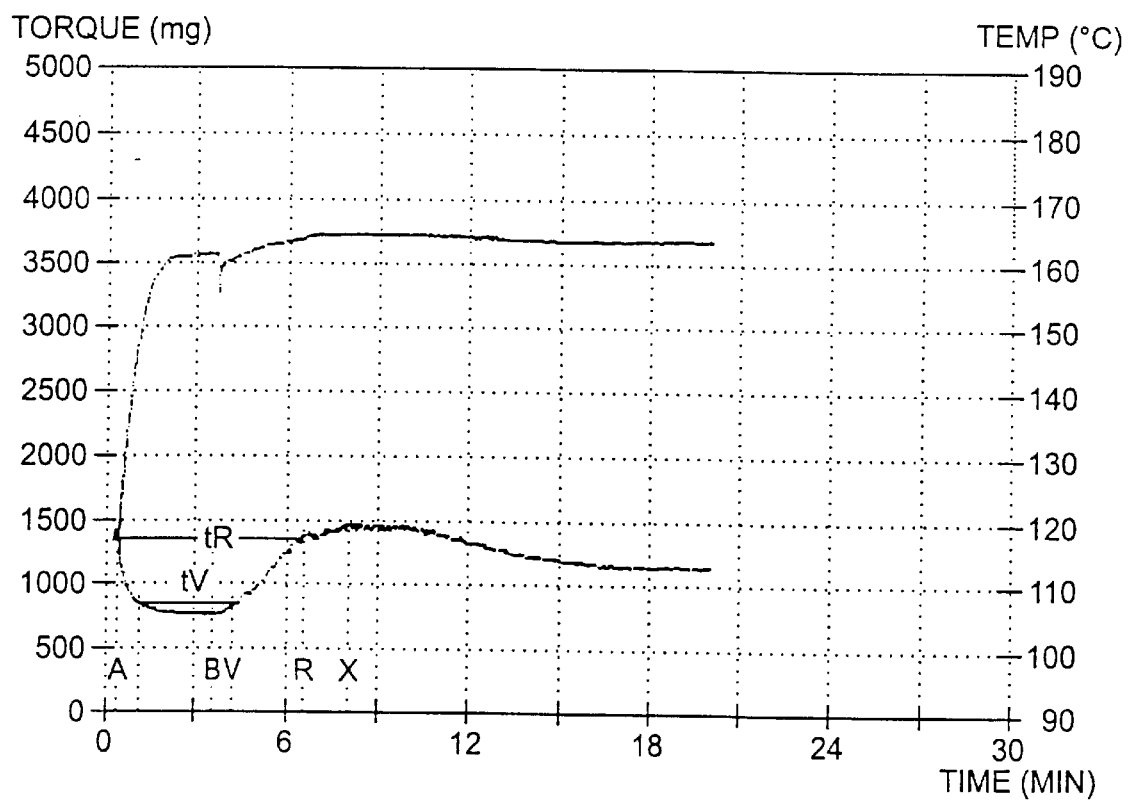
FIG. 2 is a graph depicting the cross-linking rate, as indicated by an increase in torque in the mixer over time, of an essentially linear olefin copolymer grafted with VTEOS at 163° C.
Figure 3:
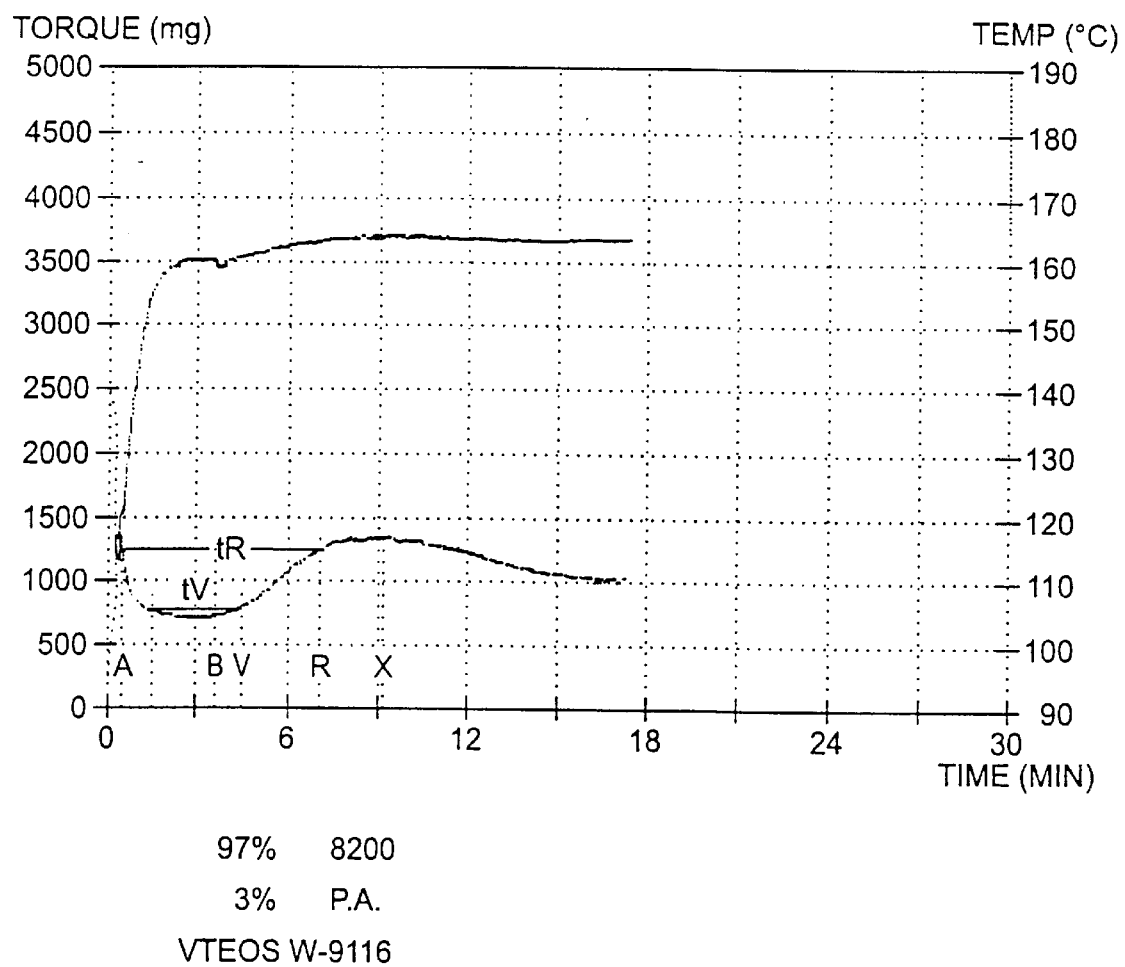
FIG. 3 is a graph depicting the cross-linking rate, as indicated by an increase in torque in the mixer over time, of an essentially linear olefin copolymer grafted with a mixture of VTEOS and 9116 at 163° C.

The change in cross-linking rate upon changing the chemical nature of the silane graft is indicated in FIGS. 1–3. The graphs indicate the relative rates of reaction at 163° C. of essentially linear olefin copolymers (i.e., Engage 8200) grafted with VTMOS (0.4%), VTEOS (1.3%), and a mixture of VTEOS and 9116 (95/5, 1.3%). A small amount of processing aid (3%) was added in each case. In FIGS. 1–3, the lower plotted line on the chart record is a plot of the cross-linking rate, as indicated by an increase in torque in the mixer over time. Points "B" (at ~3.0 minute in FIG. 1) indicate the time at which the cross-linking reaction is induced by the addition of a moisture liberating additive. The points "R" and "X" indicate the times of completing the cross-linking reactions. The time to reach the maximum cross-linking level, "X", increases as slower silanes (or blends) are used. The slope of the curve visibly indicates the slower reaction rates for the VTEOS (FIG. 2) and the VTEOS/9116 (95/5) (FIG. 3) grafted materials relative to the "fast" silane-grafted material (VTMOS; FIG. 1).

Some of the advantages in being able to use polyolefinic silane-grafted materials, in particular those of the metallocene type in producing an open cell foam include, but are not limited to: (a) no toxic residues are present in the foam, permitting their use in medical applications, for example; (b) no other residuals ordinarily found in urethane, PVC, and EVA, any of which can be skin irritating, are present; and (c) there are no EVA residuals to interfere with active additives (e.g., nerve gas deactivating chemicals. In the metallocene resin based open cell foam, there are no unwanted materials to be removed from the foamed material (and, therefore, no requirement to remove such materials in separate processing steps), since the polyolefin is essentially inert to the activity of the nerve gas deactivating chemicals. The minimization of additives can provide material and economic savings. The open cell foams can be used, for example, as air or water filtering media without imparting possible allergenic or potentially toxic (or otherwise hazardous materials) into a downstream flow of air or water.

Several additives, as are known to the art, may be added to the compositions of the present invention without departing from the scope of the invention. Specifically contemplated is the addition of materials which are relevant toward cross-linked foam structure compositional development and production, such as particulate and fibrous fillers to reinforce, strengthen or modify the rheological properties of the foam composition. Also contemplated is the addition of antioxidants (e.g., hindered phenolics such as Irganox 1010, phosphates such as Irgafos 168, or polymerized trimethyl-dihydroquinoline such as Agerite AK, Resin D or Flectol H), ultra-violet and thermal stabilizers, pigments or colorants, cell-growth nucleants such as talc and the like, cell-structure stabilizers such as fatty-acids, -esters (e.g. glycerol monostearate) or -amides, property-modifiers, processing aids, additives, catalysts to accelerate cross-linking or other reactions, and blends of two or more of the aforementioned materials.

It is possible to include different levels of additional catalysts in the mixture of materials, such as catalyst commonly added to increase the rate of cross-linking between grafted polyolefins. The slow silane-grafts materials allow for the reduction or omission of hydrolysis catalysts from the cross-linking system to provide foam materials with a high cross-link density by adjusting reactivities of the components. The omission of the additive can improve the shelf life of the material.

Other functional additives, such as maleic anhydride, can be included in the materials to improve bonding characteristics (e.g., for laminating or coating) and the ability of the foamed materials to hold fillers. It is possible to use more additives and fillers in compositions containing the slow silane-grafted materials.

The high levels of silane cross-linking agent lead to the enhancement of surface properties of polyolefinic materials. The high levels of cross-linking do not interfere with the adhesion of silane-grafted cross-linked materials to similar materials, and provide for improved bonding between the silane-grafted foams and other materials to produce laminate structures. There is also an improvement of surface properties provided by the enhancement of bonding between polyolefinic materials and applied liquid coatings (i.e., polymeric, aqueous suspensions, or solvent-carried suspensions). The enhanced surface properties of the materials allow coating of polyolefinic materials that were previously unable to be coated.

Slow silane-grafted materials can be used effectively in wire and cable formulations, both in solid and foamed form, to enhance physical properties utilizing high cross-link levels. The high levels of cross-linking can enhance process stability, providing performance characteristics similar to thermoset materials. The solid or foamed slow silane-grafted materials can also be used in water pipe and sewage pipe formulations.

Table IA is a non-limiting tabulation of certain parametric characteristics of some essentially linear polyolefin copolymers which are suitable for use with the present invention. The materials in Table IA are commercially available and are produced by the Exxon Chemical Company at its facility in Baytown, Tex.:

TABLE IA

| Product Designation | Melt Index (dg/min) | Density (g/cc) | Co-monomer Type | Content (%) | CBDI | Mw/Mn |
|---|---|---|---|---|---|---|
| Exact 4041 | 3.0 | 0.878 | 1-butene | 23.5 | NA | 2.0 ± 0.2 |
| Exact 5008 | 10 | 0.865 | 1-butene | 31.6 | NA | 2.0 ± 0.2 |
| Exact 4028 | 10 | 0.880 | 1-butene | 23.1 | NA | 2.0 ± 0.2 |
| Exact 4017 | 4.0 | 0.885 | 1-butene | 20.2 | NA | 2.0 ± 0.2 |
| Exact 4024 | 4.5 | 0.905 | 1-butene | 11.2 | 83.7 | 2.0 ± 0.2 |
| Exact 3025 | 1.2 | 0.910 | 1-butene | 9.6 | >83 | 2.0 ± 0.2 |
| Exact 3012 | 4.5 | 0.910 | 1-hexene | 10.4 | 88.2 | 2.0 ± 0.2 |
| Exact 3011 | 3.5 | 0.910 | 1-hexene | 11.1 | 92.0 | 2.0 ± 0.2 |
| Exact 3030 | 2.25 | 0.905 | 1-hexene | 12.9 | 92.2 | 2.0 ± 0.2 |
| Exact 3031 | 3.5 | 0.900 | 1-hexene | 15.4 | >88 | 2.0 ± 0.2 |

Notes: NA = Not Applicable, polymer is too soluble to determine by TREF.

The following examples are illustrative of certain features of the present invention, and are not intended to be limiting.

Examples 1–7 illustrate the continuous extrusion process of the present invention.

EXAMPLE 1

A silane-grafted composition, consisting primarily of a resin of the present invention along with polyethylene/ethyl acrylate (EEA) as a softener, was prepared at the rate of about 30 lb/hr using a 60 mm diameter, 24:1 L/D, single-screw extruder maintained at approximately 200° C. A mixture of organic peroxide and VTMOS was metered directly into the feed throat of the extruder. The grafted composition was passed out of a multi-strand die head through a water-cooling trough, and chopped into pellets with a granulator. The composition of the pellets consisted of:

| pbw | Material |
|---|---|
| 90 | Exact 4041, Exxon Chemical Co. |
| 10 | DPDA 6182 (0.930 g/cm$^3$, 1.5 MI), polyethylene/ethyl acrylate, 15% ethyl acrylate content, Union Carbide Corp. |
| 0.4 | #CV4917, Vinyl trimethoxy silane, Huls America, Inc. |
| 0.02 | Vulcup-R, 2,2'-(tert-butylperoxy) diisopropylbenzene, Hercules Chemical Co. |

The pellicular grafted composition was admixed with additional pellicular components in a 5 gallon drum tumbler, metered into a 2.5" diameter, 24:1 L/D single-screw extruder maintained at approximately 125° C. and fitted with a 14" wide coat-hanger die head, and passed through a 24" wide three-roll stack to form an unexpanded sheet, 9" wide× 0.069" thick, of the following composition:

| pbw | Material |
|---|---|
| 78.9 | Exact 4041/DPDA 6182 graft, from above |
| 3.3 | DFDA-1173 NT, 1% dibutyl tin dilaurate concentrate in LDPE (0.92 g/cm$^3$, 2.0 MI), Union Carbide Corp. |
| 11.6 | 40% concentrate of Bayer ADC/F azodicarbonamide in EEA-6182 |
| 3.9 | 20% zinc stearate, 30% zinc oxide |

-continued

| pbw | Material |
|---|---|
| 2.3 | concentrate in high-pressure LDPE (7–8 MI)<br>White color concentrate, 50% titanium dioxide in high-pressure LDPE (7–8 MI) |

The sheet was exposed to 190° F. and 95% relative humidity for 80 minutes to effect the silanolysis cross-linking. Subsequently, the sheet was passed through a thermostatically-controlled foaming oven with infrared heaters to maintain a surface temperature of 670° F., but with supplementary makeup air at 730° F., whereupon the cross-linked composition expanded to a width of 20"×0.150" thickness. The resulting density was 6 pcf, with additional properties as shown in Table I.

COMPARATIVE EXAMPLE 1A

A silane-grafted, pellicular composition, comprising a mixture of LDPE and LLDPE, was prepared at the rate of about 400 lb/hr using a 4" diameter, 44:1 L/D, single-screw extruder maintained at approximately 200° C. A mixture of organic peroxide and vinyl trimethoxy silane was metered directly into the feed throat of the extruder. The grafted composition was passed out of a multi-strand die head and through a water-cooling trough, and was chopped into pellets with a granulator. The composition consisted of:

| pbw | Material |
|---|---|
| 67 | LF-0219A, LDPE (0.919 g/cm$^3$, 2.0 MI), Novacor Chemical Co. |
| 33 | ETS 9078, LLDPE (0.910 g/cm$^3$, 2.5 MI), Union Carbide Corp. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components in a 200 gallon ribbon blender. The mixture was metered into a 6" diameter, 24:1 L/D single-screw extruder maintained at approximately 125° C. and fitted with a 30" wide coat-hanger die head, and passed through a 52" wide three-roll stack to form an unexpanded sheet of the following composition:

| pbw | Material |
|---|---|
| 67.5 | LF-0219A/ETS 9078 graft, from above |
| 11.2 | LF-0219A, LDPE (0.919 g/cm$^3$, 2.0 MI), Novacor Chemical Co. |
| 3.5 | DFDA-1173 NT, 1% dibutyl tin dilaurate concentrate in LDPE (0.92 g/cm$^3$, 2.0 MI), Union Carbide Corp. |
| 9.8 | 40% concentrate of Bayer ADC/F azodicarbonamide in LDPE (0.919 g/cm$^3$, 2.0 MI) |
| 6.0 | 20% zinc stearate, 30% zinc oxide concentrate in high-pressure LDPE (7–8 MI) |
| 2.0 | White color concentrate, 50% titanium dioxide in high pressure LDPE (7–8 MI) |

As described above, the sheet was exposed to 190° F. moisture to effect the silanolysis cross-linking then passed through a thermostatically-controlled foaming oven. The resulting density was 6 pcf, with comparative properties as shown in Table I. The object cross-linked foam structure of Example 1, containing the essentially linear olefin copolymer of this invention, exhibited superior tensile strength, elongation, compression set and a finer cell size, in comparison to the LLDPE/LDPE foam article of this example.

EXAMPLE 2

This example illustrates the preparation of a 2 pcf density foam structure in accordance with the method of the present invention.

The essentially linear olefin copolymer silane-grafted composition of Example 1 was admixed with additional pellicular components, extruded on a sheet line with coat-hanger die and three-roll stack as described in Example 1, and slit down into a continuous sheet 5" wide and 0.070" thick and having the following composition:

| pbw | Material |
|---|---|
| 56.7 | Exact 4041/DPDA 6182 graft, from Example 1, above. |
| 3.6 | DFDA-1173 NT, 1% dibutyl tin dilaurate concentrate in LDPE (0.92 g/cm$^3$, 2.0 MI), Union Carbide Corp. |
| 33.2 | 40% concentrate of Bayer ADC/F azodicarbonamide in EEA-6182 |
| 4.0 | 20% zinc stearate, 30% zinc oxide concentrate in high-pressure LDPE (7–8 MI) |
| 2.5 | White color concentrate, 50% titanium dioxide in high pressure LDPE (7–8 MI) |

The sheet was then exposed to 200° F./95% relative humidity for 60 minutes to effect the silanol condensation and cross-linking. Subsequently, the sheet was passed through a thermostatically-controlled foaming oven with infrared heaters to maintain a surface temperature of 680° F., but with supplementary makeup air at 750° F., whereupon the sheet expanded to a width of 20"×0.365" thickness. The resulting density was 2.2 pcf, with additional properties as shown in Table I.

COMPARATIVE EXAMPLE 2A

A silane-grafted, pellicular composition was prepared using the same equipment and methods as described in Example 1A, but with a mixture of LDPE and LLDPE, according to the following composition:

| pbw | Material |
|---|---|
| 80 | LF-0219A, LDPE(0.919 g/cm$^3$, 2.0 MI), Novacor Chemical Co. |
| 20 | ETS 9078, LLDPE(0.910 g/cm$^3$, 2.5 MI), Union Carbide Corp. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components and extruded on a sheet line with coat-hanger die and three-roll stack, as described in Example 1A, to give an extrudate of the following composition:

| pbw | Material |
|---|---|
| 56.7 | LF-0219A/ETS 9078 graft, from above |
| 3.6 | DFDA-1173 NT, 1% dibutyl tin dilaurate concentrate in LDPE(0.92 g/cm$^3$, 2.0 MI), Union Carbide Corp. |

-continued

| pbw | Material |
|---|---|
| 33.2 | 40% concentrate of Bayer ADC/F azodicarbonamide in LDPE(0.919 g/cm³, 2.0 MI) |
| 4.0 | 20% zinc stearate, 30% zinc oxide concentrate in high pressure LDPE (7–8 MI) |
| 2.5 | White color concentrate, 50% titanium dioxide in high pressure LDPE (7–8 MI) |

As described in Example 1A, the sheet was exposed to 190° F. moisture to effect the silanolysis cross-linking, and then passed through a thermostatically-controlled foaming oven. The resulting density was 2 pcf, with comparative properties as shown in Table I. The object cross-linked foam structure of Example 2, containing the essentially linear olefin copolymer of this invention, exhibited superior tensile strength and elongation, and a finer cell size in comparison to the LLDPE/LDPE foam article of this example.

EXAMPLE 3

This example illustrates the preparation of a 3 pcf density foam structure in accordance with the method of the present invention.

The essentially linear olefin copolymer silane-grafted composition of Example 1 was admixed with additional pellicular components and extruded on a sheet line with coat-hanger die and three-roll stack, as described in Example 1, and slit down into a continuous sheet 5" wide and 0.070" thick and having the following composition:

| pbw | Material |
|---|---|
| 68.1 | Exact 4041/DPDA 6182 graft, from Example 1, above |
| 3.4 | DFDA-1173 NT, 1% dibutyl tin dilaurate concentrate in LDPE(0.92 g/cm³, 2.0 MI), Union Carbide Corp. |
| 22.3 | 40% concentrate of Bayer ADC/F azodicarbonamide in EEA-6182 |
| 3.7 | 20% zinc stearate/ 30% zinc oxide concentrate in high pressure LDPE (7–8 MI) |
| 2.5 | White color concentrate, 50% titanium dioxide in high pressure LDPE (7–8 MI) |

As described in Example 1, the sheet was exposed to 150° F. and 95% relative humidity for 18 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked sheet expanded to a width of 16.5"×0.350" thickness. The resulting density was 3.0 pcf, with additional properties as shown in Table I.

COMPARATIVE EXAMPLE 3A

A silane-grafted, pellicular composition was prepared using the same equipment and methods as described in Example 1A, but with a mixture of LDPE and LLDPE, according to the following composition:

| pbw | Material |
|---|---|
| 67 | LF-0219A, LDPE (0.919 g/cm³, 2.0 MI), Novacor Chemical Co. |
| 33 | ETS 9078, LLDPE(0.910 g/cm³, 2.5 MI), Union Carbide Corp. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components and extruded on a sheet line with coat-hanger die and three-roll stack, as described in Example 1A, to give an extrudate with the following composition:

| pbw | Material |
|---|---|
| 59.6 | LF-0219A/ETS 9078 graft, from above |
| 9.0 | LF-0219A, LDPE(0.919 g/cm³, 2.0 MI), Novacor Chemical Co. |
| 3.5 | DFDA-1173 NT, 1% dibutyl tin dilaurate concentrate in LDPE(0.92 g/cm³, 2.0 MI), Union Carbide Corp. |
| 22.3 | 40% concentrate of Bayer ADC/F azodicarbonamide in LDPE (0.919 g/cm³, 2.0 MI) |
| 4.1 | 20% zinc stearate, 30% zinc oxide concentrate in high-pressure LDPE (7–8 MI) |
| 2.5 | White color concentrate, 50% titanium dioxide in high pressure LDPE (7–8 MI) |

As described in Example 1A, the sheet was exposed to 190° F. moisture to effect the silanolysis cross-linking, and then passed through a thermostatically-controlled foaming oven. The resulting density was 3 pcf, with comparative properties as shown in Table I. The object cross-linked foam structure of Example 3, containing the essentially linear olefin copolymer of this invention, exhibited superior tensile strength, elongation, compression set and a finer cell size, in comparison to the LLDPE/LDPE foam article of this example.

EXAMPLE 4

This example illustrates the preparation of a 4 pcf density foam structure in accordance with the method of the present invention.

A silane-grafted, pellicular composition was prepared using the same equipment and methods as described in Example 1, and consisting primarily of a resin of the present invention along with polyethylene/ethyl acrylate (EEA) as a softener and a minor amount of a fluoroelastomer processing aid concentrate designated as SAX 7401. The composition consisted of the following ingredients:

| pbw | Material |
|---|---|
| 85 | Exact 4041, Exxon Chemical Co. |
| 10 | DPDA 6182 (0.930 g/cm³, 1.5 MI), polyethylene/ethyl acrylate, 15% ethyl acrylate content, Union Carbide Corp. |
| 5 | SAX 7401, fluoroelastomer processing aid, Dupont Chemical Co. |
| 0.4 | #CV4917, Vinyl trimethoxy silane, Huls America, Inc. |
| 0.02 | Vulcup-R, 2,21-bis(tert-butylperoxy) diisopropyl benzene, Hercules Chemical Co. |

The essentially linear olefin copolymer silane-grafted composition from above was admixed with additional pellicular components and extruded on a sheet line with coathanger die and three-roll stack, as described in Example 1, and slit down into a sheet of 8" width×0.041" thick, to give an extrudate of the following composition:

| pbw | Material |
|---|---|
| 72.0 | Exact 4041/DPDA 6182/SAX 7401 graft, from above |
| 3.5 | DFDA-1173 NT, 1% dibutyl tin dilaurate concentrate in LDPE (0.92 g/cm$^3$, 2.0 MI), Union Carbide Corp. |
| 18.5 | 40% concentrate of Bayer ADC/F azodicarbonamide in EEA 6182 |
| 4.0 | 20% zinc stearate, 30% zinc oxide concentrate in high pressure LDPE (7–8 MI) |
| 2.0 | Black color concentrate, 45% carbon black in high-pressure LDPE (7–8 MI) |

As described in Example 1, the sheet was exposed to 150° F. and 95% relative humidity for 16 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked sheet expanded to a width of 21"×0.150" thickness. The resulting density was 4.1 pcf, with additional properties as shown in Table I.

COMPARATIVE EXAMPLE 4A

A silane-grafted, pellicular composition was prepared using the same equipment and methods as described in Example 1A, but with a mixture of LDPE and LLDPE, according to the following composition:

| pbw | Material |
|---|---|
| 67 | LF-0219A, LDPE (0.919 g/cm$^3$, 2.0 MI), Novacor Chemical Co. |
| 33 | ETS 9078, LLDPE (0.910 g/cm$^3$, 2.5 MI), Union Carbide Corp. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The pellicular grafted composition was admixed with additional pellicular components and extruded on a sheet line with coat-hanger die and three-roll stack, as described in Example 1A, to give an extrudate of the following composition:

| pbw | Material |
|---|---|
| 73.1 | LF-0219A/ETS 9078 graft, from above |
| 3.5 | DFDA-1173 NT, 1% dibutyl tin dilaurate concentrate in LDPE (0.92 g/cm$^3$, 2.0 MI). Union Carbide Corp. |
| 15.2 | 40% concentrate of Bayer ADC/F azodicarbonamide in LDPE (0.919 g/cm$^3$, 2.0 MI) |
| 6.0 | 20% zinc stearate, 30% zinc oxide concentrate in high pressure LDPE (7–8 MI) |
| 2.0 | Black color concentrate, 45% carbon black in high pressure LDPE (7–8 MI) |

As described in Example 1A, the sheet was exposed to 190° F. moisture to effect the silanolysis cross-linking, and then passed through a thermostatically-controlled foaming oven. The resulting density was 4 pcf, with comparative properties as shown in Table I. The object cross-linked foam structure of Example 4, containing the essentially linear olefin copolymer of this invention, exhibited superior tensile strength, elongation, and a finer cell size, in comparison to the LLDPE/LDPE foam article of this example.

EXAMPLE 5

This example illustrates the process dependency of the foam properties of materials made in accordance with the present invention.

Samples of the extruded and calendared sheet from Example 4 were stacked to a combined thickness of 0.75", placed into a mold and pressed for 67 minutes in a 200 Ton compression-molding press with platens thermostatically controlled at 300° F. The pressure was released, the press opened and the molded bun partially expanded in response to the decrease in pressure. Cross-linking was induced only by the effect of the residual moisture in the composition at the time of compression-molding. The resulting density was 3.2 pcf, with additional properties as shown in Table I. This object exhibited superior tensile strength, elongation, compression set and a finer cell size, in comparison to the 3 pcf density LLDPE/LDPE foam article of Example 3A. In comparison to the foam structure of Example 3, which was also a 3 pcf object of the present invention, certain properties were superior, indicating that foam properties of the present discovery are somewhat process dependent.

EXAMPLE 6

This example illustrates the preparation of a 3 pcf density foam structure based on polypropylene and the essentially linear olefin polymers of this invention.

A silane-grafted, pellicular composition was prepared using the same equipment and methods as described in Example 1, but at a temperature of 220° C., consisting primarily of a 3 MI polypropylene along with a 3 MI resin of the present invention, according to the following composition:

| pbw | Material |
|---|---|
| 70 | Exact 4017, Exxon Chemical Co. |
| 30 | Escorene PD 9272 (0.89 g/cm$^3$, 3.1 MI), polypropylene, Exxon Chemical Co. |
| 0.5 | #CV4917, Vinyl trimethoxy silane, Huls America, Inc. |
| 0.025 | Vulcup-R, 2,2'-bis(tert-butylperoxy) diisopropyl benzene, Hercules Chemical Co. |

The essentially linear olefin copolymer silane-grafted composition from above was admixed with additional pellicular components, extruded on a sheet line with coathanger die and three-roll stack as described in Example 1, and slit down into a sheet 7" wide and 0.052" thick, to give a material of the following composition:

| pbw | Material |
|---|---|
| 72.0 | Exact 4017/EscoreneTM PD 9272 graft, from above |
| 3.6 | DFDA-1173 NT, 1% dibutyl tin dilaurate concentrate in LDPE (0.92 g/cm$^3$, 2.0 MI), Union Carbide Corp. |
| 23.8 | 40% concentrate of Bayer ADC/F azodicarbonamide in Exact 4041 |

As described in Example 1, the sheet was exposed to 150° F. and 95% relative humidity for 32 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked composition expanded to a width of 20" and a thickness of 0.190". The resulting density was 2.8 pcf, with additional properties as shown in Table I. Shown for comparison and reference therein is a competitive organic peroxide cross-linked foam product of 3 pcf density.

EXAMPLE 7

In this example, a 4 pcf density foam structure is prepared based on a silane-grafted composition of primarily LDPE along with a minor amount of the essentially linear olefin polymers of this invention.

A silane-grafted, pellicular composition was prepared using the same equipment and methods as described in Example 1, according to the following composition:

| pbw | Material |
|---|---|
| 30 | Exact 4041, Exxon Chemical Co. |
| 70 | LF-0219A, LDPE (0.919 g/cm³, 2.0 MI), Novacor Chemical Co. |
| 0.4 | #CV4917, Vinyl trimethoxy silane, Huls America, Inc. |
| 0.02 | Vulcup-R, 2,2'-bis(tert-butylperoxy) diisopropyl benzene, Hercules Chemical Co. |

The silane-grafted composition containing the essentially linear olefin copolymer from above was admixed with additional pellicular components, extruded on a sheet line with coat-hanger die and three-roll stack as described in Example 1, and slit down into a sheet of 8" width and 0.041" thickness. The resulting sheet had the following composition:

| pbw | Material |
|---|---|
| 72.0 | Exact 4017/Escorene PD 9272 graft, from above |
| 3.5 | DFDA-1173 NT, 1% dibutyl tin dilaurate concentrate in LDPE (0.92 g/cm³, 2.0 MI), Union Carbide Corp. |
| 18.5 | 40% concentrate of Bayer ADC/F azodicarbonamide in EEA 6182 |
| 4.0 | 20% zinc stearate, 30% zinc oxide concentrate in high pressure LDPE (7–8 MI) |
| 2.0 | Black color concentrate, 45% carbon black in high pressure LDPE (7–8 MI) |

As described in Example 1, the sheet was exposed to 150° F. and 95% relative humidity for 16 hours to effect the silanolysis cross-linking. Subsequently, the sheet was passed through a thermostatically-controlled foaming oven with infrared heaters to maintain a surface temperature of 700° F., but with supplementary makeup air at 750° F., whereupon the cross-linked composition expanded to a width of 21"× 0.150" thickness. The resulting density was 4.1 pcf, with additional properties as shown in Table I. Shown for comparison and reference therein is a competitive radiation cross-linked foam product of 4 pcf density, demonstrating the superiority of the object of this discovery toward the properties of tensile strength and elongation.

Examples 8–14 illustrate the preparation of articles through the use of compression-molding.

EXAMPLE 8

This example demonstrates the use of the essentially linear olefin copolymers to produce a press cured foam bun, using both chemical cross-linking (organic peroxide) as well as silane-grafting followed by exposure to moist heat to effect the silanol condensation and thus cross-linking. Process conditions, cross-linking sequencing, and expansion procedures were adjusted to optimize the preparation of the cross-linked foam structure of this art for the particular selection of method of cross-linking.

In this example, an organic peroxide cross-linking system was utilized with the olefin copolymer object of this invention by methods commonly employed for the production of cross-linked LDPE molded foam buns. The composition utilized comprised:

| pbw | Material |
|---|---|
| 100 | Exact 4041, Exxon Chemical Co. |
| 10 | Azodicarbonamide, 10 micron particle size |
| 0.25 | Kadox 911C, zinc oxide, Zinc Corp. of America |
| 0.5 | dicumyl peroxide, 99% active |

The composition was mixed in an internal, high shear "Banbury" type mixer by fusing the mixture at approximately 240° F., which is below the decomposition temperature of the foaming agent. The resulting admixture was calendared and shaped into a preform so as to fill a 1.25" deep, rectangular mold cavity. The mold with preform therein was then held in a 200 ton compression molding press for 55 minutes at 305° F. Following release from the press, the resulting bun was further heated in a hot air oven for 40 minutes at 330° F. The resulting density was 2 pcf, with additional properties as shown in Table II. Internal voids and a tendency to over-cross-link and under-expand, symptomatic of LLDPE response similarly cured, were observed herein.

EXAMPLE 9

In this example, the olefin copolymer object of this invention was silane-grafted by methods described in Example 1 according to the following composition:

| pbw | Material |
|---|---|
| 100 | Exact 4041, Exxon Chemical Co. |
| 0.4 | #CV4910, Vinyl triethoxy silane, Huls America, Inc. |
| 0.02 | Vulcup-R, 2,2'-bis(tert-butylperoxy) diisopropyl benzene, Hercules Chemical Co. |

Utilizing the above silane-grafted composition, the following was mixed in an internal, high shear "Banbury" type mixer by fusing the mixture at approximately 240° F., which is below the decomposition temperature of the foaming agent:

| pbw | Material |
|---|---|
| 100 | Exact 4041/VTEOS-grafted resin, from above |
| 14 | Azodicarbonamide, 10 micron particle size |
| 0.3 | Kadox 911C, zinc oxide, Zinc Corp. of America |
| 6.0 | DFDA-1173 NT, 1% dibutyl tin dilaurate concentrate in LDPE (0.92 g/cm³, 2.0 MI), Union Carbide Corp. |

The resulting admixture was calendared and shaped into a preform so as to fill a 1.25" deep, rectangular mold cavity.

The preform was then exposed to 95% relative humidity conditions for sufficient time so as to effect the cross-linking. The preform was placed into the mold, and held in a 200 ton compression molding press for 75 minutes at 290° F. Following release from the press, the resulting bun was further heated in a hot air oven for 40 minutes at 330° F. The resulting density was 2 pcf, with additional properties as shown in Table II.

EXAMPLE 10

Herein, the silane-grafted and cross-linked preform of Example 9 was expanded without the pressing operation, i.e. "freely expanded", in an oven for 60 minutes at 330° F. The resulting density was 2.7 pcf, with additional properties as shown in Table II.

EXAMPLE 11

In this example, an organic peroxide cross-linking system was utilized with the olefin copolymer object of this invention in a blended composition with ethylene vinyl acetate (EVA), ethylene methyl acrylate (EMA) and ethylene/propylene diene monomer terpolymer (EPDM), comprising:

| pbw | Material |
|---|---|
| 30 | Exact 4041, Exxon Chemical Co. |
| 5 | AT-1070, EVA, 9% vinyl acetate content, AT Plastics, Inc. |
| 30 | AT-1710, EVA, 17% vinyl acetate content, AT Plastics, Inc. |
| 30 | XV 53-04, EMA, 15% methyl acrylate content, 0.7 MI, Exxon Chemical Company |
| 5 | Nordel 1440, EPDM, 45 Mooney viscosity, 55% ethylene content, 5% diene content, Dupont, Inc. |
| 10 | Azodicarbonamide, 10 micron particle size |
| 0.11 | Kadox 911C, zinc oxide, Zinc Corp. of America |
| 0.9 | dicumyl peroxide, 99% active |
| 0.05 | Irganox 1010, antioxidant, Ciba Geigy Corp. |

The composition was mixed as described in Example 8 and similarly calendared and shaped. The mold with preform therein was then held in a 200 ton compression molding press for 60 minutes at 290° F. Following release from the press, the resulting bun was further heated in a hot air oven for 60 minutes at 330° F. The resulting density was 1.5 pcf, with additional properties as shown in Table II.

EXAMPLE 12

In this example, an organic peroxide cross-linking system was utilized with a lower specific gravity version of the olefin copolymer object of this invention in a blended composition with ethylene vinyl acetate (EVA) and ethylene/propylene diene monomer terpolymer (EPDM), comprising:

| pbw | Material |
|---|---|
| 50 | Exact 5008, Exxon Chemical Co. |
| 10 | AT-2306, EVA, 23% vinyl acetate content, AT Plastics, Inc. |
| 30 | AT-2803-A, EVA, 289., vinyl acetate content, AT Plastics, Inc. |
| 10 | Nordel 1440, EPDM, 45 Mooney viscosity, 55% ethylene content, 5% diene content, Dupont, Inc. |
| 14 | Azodicarbonamide, 10 micron particle size |
| 0.2 | Kadox 911C, zinc oxide, Zinc Corp. of America |
| 1.0 | dicumyl peroxide, 99% active |
| 0.5 | Irganox 1010, antioxidant, Ciba Geigy Corp. |
| 0.6 | Silicone oil |
| 0.4 | Coagent |
| 20 | Calcium Carbonate |

The composition was mixed as described in Example 8 and similarly calendared and shaped. The mold with preform therein was then held in a 200 ton compression molding press for 60 minutes at 290° F. Following release from the press, the resulting bun was further heated in a hot air oven for 60 minutes at 330° F. The resulting density was 2 pcf, with additional properties as shown in Table II.

COMPARATIVE EXAMPLE 13

In this example, an organic peroxide cross-linking system was utilized with LDPE, by methods commonly employed for the production of cross-linked LDPE molded foam buns. The composition comprised the following ingredients:

| pbw | Material |
|---|---|
| 100 | Dowlex 510, LDPE (0.919 g/cm$^3$, 2.0 MI), Dow Chemical Co. |
| 14.4 | Azodicarbonamide, 10 micron particle size |
| 0.25 | Kadox 911C, zinc oxide, Zinc Corp. of America |
| 0.52 | dicumyl peroxide, 99% active |
| 0.53 | Paraffinic oil |

The composition was mixed as described in Example 8 and similarly calendared and shaped. The mold with preform therein was then held in a 200 ton compression molding press for 40 minutes at 310° F. Following release from the press, the resulting bun was further heated in a hot air oven for minutes at 320° F. The resulting density was 2 pcf, with additional properties as shown in Table II.

COMPARATIVE EXAMPLE 14

Herein, an organic peroxide cross-linking system was utilized with EVA, by methods commonly employed for the production of cross-linked EVA molded foam buns. The composition comprised the following ingredients:

| pbw | Material |
|---|---|
| 100 | Dowlex 510, LDPE (0.919 g/cm$^3$, 2.0 MI), Dow Chemical Co. |
| 14.4 | Azodicarbonamide, 10 micron particle size |
| 0.25 | Kadox 911C, zinc oxide, Zinc Corp. of America |
| 0.52 | dicumyl peroxide, 99% active |
| 0.53 | Paraffinic oil |

The composition was mixed at a fusion temperature of 225° F. as described in Example 8 and similarly calendared and shaped. The mold with preform therein was then held in a 200 ton compression molding press for 40 minutes at 295° F. Following release from the press, the resulting bun was further heated in a hot air oven for 25 minutes at 320° F. The resulting density was 2.1 pcf, with additional properties as shown in Table II.

TABLE I

COMPARATIVE PROPERTIES OF CONTINUOUS PROCESS EXAMPLES

| | Example 1 | Example 1A | Example 2 | Example 2A | Example 3 | Example 3A | Example 4 | Example 4A |
|---|---|---|---|---|---|---|---|---|
| Density (pcf) | 6 | 6 | 2.2 | 2 | 3 | 3 | 4.1 | 4 |
| Tensile Strength (psi) | 235 | 154 | 77 | 40 | 113 | 53 | 132 | 91 |
| Elongation (%) | 562 | 350 | 474 | 235 | 533 | 360 | 475 | 345 |
| Tear Strength (pli) | 29.3 | 38 | 11.6 | 11.6 | 18.1 | 14.5 | 22.3 | 26.5 |
| Compression Resistance (psi) at 25% | 10.9 | 17 | 3.3 | 4.9 | 4.6 | 5.1 | 5.7 | 8.9 |
| Compression Set, 50% (%) compr. | 9 | 15 | 32.8 | 30 | 17.6 | 25 | 20 | 20 |
| Cell Size Mode (mm) | 0.1 | 0.3 | 0.2 | 0.4 | 0.2 | 0.4 | 0.2 | 0.3 |
| Thermal Stability (%) Shrinkage 3 hours @ 250° F. | | | | | | | | |

| | Example 5 Free Expanded | Example 5 Press Expanded | Example 6 | Example 3A | 3 PCF XLPE TORAY | Example 7 | 4PCF Radiation XL Foam Voltek (Volara #4A) |
|---|---|---|---|---|---|---|---|
| Density (pcf) | 4.1 | 3.2 | 2.8 | 3 | 3 | 4.1 | 4 |
| Tensile Strength (psi) | 132 | 116 | 94 | 53 | 132 | 108 | |
| Elongation (%) | 475 | 460 | 405 | 360 | 124 | 475 | 162 |
| Tear Strength (pli) | 22.3 | 17.6 | 14.5 | 235 | 22.3 | 20 | |
| Compression Resistance (psi) at 25% | 5.7 | 5 | 5.1 | 5.7 | 10 | | |
| Compression Set, 50% (%) compr. | 20 | 14.5 | 25 | 20 | 16 | | |
| Cell Size Mode (mm.) | 0.2 | 0.15 | 0.4 | 0.2 | ND | | |
| Thermal Stability (%) Shrinkage 3 hours @ 250° F. | | | 31.3 | 1.9 | | | |

TABLE II

COMPARATIVE PROPERTIES OF MOLDED BUN COMPARATIVE EXAMPLES

| Formulation | 8 | 9 | 10 | 11 | 12 | 13 | 14 |
|---|---|---|---|---|---|---|---|
| Density (pcf) | 2 | 2.09 | 2.66 | 1.5 | 2.0 | 2.06 | 2.1 |
| Tensile Strength (psi) | ND | 55 | ND | 35 | 75 | 50 | 61 |
| Ultimate Elongation (%) | ND | 440 | ND | 280 | 260 | 180 | 370 |
| 25% CD, (psi) | ND | 3.4 | ND | 2.3 | 2.3 | 10 | 5.1 |
| 50% CS, (%) | ND | 30 | ND | 35 | 35 | 20 | 16 |
| Cell Size Mode (mm) | Collapsed[a] | 0.5[b] | 1.0[b] | 0.1 | 0.2 | 0.14 | 0.15 |

[a] poor quality foam
[b] with some 1.5 mm cells

EXAMPLE 15

A chemically blown block (bun) material that exhibited enhanced bonding properties was prepared by using a co-cure system of silane and peroxide to cross-link a polyolefinic material while foaming in a two step process. Example 15 contained silane-grafted resin and Example 15A was not silane-grafted. The material had the following composition:

| Formulation | Example 15 | Example 15A |
|---|---|---|
| Component | PHR | PHR |
| Engage 8200 1% graft VTEOS | 100 | 0 |
| Engage 8200 | 0 | 65 |
| LDPE | 0 | 35 |
| Dibutyl tin dilaurate | 0.03 | 0 |
| Zinc oxide | 0.2 | 0.2 |
| Azodicarbonamide | 13.3 | 13.75 |
| Parafinic process oil | 0.3 | 0.2 |
| Dicumyl peroxide | 0.2 | 0.9 |
| Anti-oxidant | 0 | 0.5 |

As described in previous Examples, a VLDPE essentially linear polyolefin resin was grafted with VTEOS in a laboratory extruder at approximately 375° F. Following the extrusion reaction, the grafted resin was cooled and pelletized. The cooled, grafted and pelletized resin was compounded with additional ingredients, including a blowing agent, activators, anti-oxidants, additional peroxide cross-linking agent, and dispersant aids as indicated in the above formulation. All ingredients were incorporated into the grafted resin on a two roll mill set at approximately 250° F. Mixing was accomplished by sequential addition of portions of the materials into the polymer. The fluxed and fused polymer was banded on the heated mill roll surface as is customary in mixing in this operation when there is no availability of an internal high intensity batch mixer. At the completion of the mixing operation, the hot compounded material was sheeted off the mill at approximately 3/8" thickness.

While still hot, the pre-formed material was then layered (plied up) into a 1.25"×6"×6" preheated rectangular flat mold cavity. The mold with compound was then immediately placed between heated hydraulic press platens. The hydraulic press was closed and the cure/expansion cycle was begun. The material was heated under approximately 900 psi for 50 minutes at 300° F. At the end of the cycle the material was removed from the heated press platens as a removed hot, partially cured and partially foamed material and placed directly into a hot air oven for further curing. The semi-cured and foamed bun was further cured for approximately 40 minutes at approximately 320° F. The resulting expanded material was a white, fine celled foam with acceptable appearance and acceptable physical properties.

The foam was allowed to cool and age prior to skiving for physical property testing.

The sample was also evaluated to assess the effect of the use of grafted resin on bonding a vinyl dip solution to the foam surface. Both Example 15 (made with the silane-grafted essentially linear polyolefin resin) and Example 15A (made with the ungrafted essentially linear polyolefin resin) were dipped into a PVC/organic solvent coating solution. The first coating was allowed to dry overnight. After air drying, both samples were again dipped into the PVC solution to increase the thickness of the coating. The second coating was also allowed to dry overnight.

An assessment was made of the bonding of the dip coating to each of the samples. The silane-grafted material had improved surface bonding to the vinyl dip solution. There was more of a foam tear with the silane-grafted resin based foam than with the ungrafted resin based foam when the dip coating was peeled off. The foam tearing in Example 15 indicates that the bond between the dip coating and the foam is greater than the strength of the foam itself. The physical properties of Examples 15 and 15A are summarized in Table III.

TABLE III

| Property | Example 15 | Example 15A |
|---|---|---|
| Density (pcf) | 2.17 | 2.5 |
| Tensile (psi) | 56 | 58 |
| Elongation (%) | 360 | 345 |
| 25% Compression Deflection (psi) | 2.6 | 3.1 |
| 50% Compression Deflection (psi) | 9.2 | 9.5 |
| 50% Compression Set (%) (ASTM-3575) | 37 | 27 |
| 50% Compression Set (%) (ASTM-1056) | 74 | 58 |
| Tear Die C (pli) | 5.6 | 8.9 |

TABLE III-continued

| Property | Example 15 | Example 15A |
|---|---|---|
| Durometer Shore 00 | 30 | 43 |
| Cell size average (mm) | 0.16 | 0.24 |
| Cell size min. (mm) | 0.05 | 0.05 |
| Cell size max. (mm) | 0.37 | 0.05 |
| Dip bonding | foam tears | residual dip on foam, dip peels off |

EXAMPLES 16–18

A chemically blown bun material was produced by a silane-graft cross-linking mechanism only. The polymer resin was grafted with VTEOS and the compositions are prepared with and without adding the cross-linking catalyst dibutyl tin dilaurate. Both materials produced foams with acceptable properties. There is greater flexibility achieved in foam production with slow silane mechanism. This Example illustrates the affects of higher levels of cross-linking on physical properties of the foams and the attributes of a co-cure system utilizing both silane and peroxide cross-linking mechanisms.

The grafted resin was prepared as described in the previous Examples. In each Example, the grafted resin was compounded with other ingredients described in Example 15 according to the following formulations:

| Formulation | Example 16 | Example 17 | Example 18 | Example 17A |
|---|---|---|---|---|
| Component | PHR | PHR | PHR | PHR |
| Engage 8200 1.6% VTEOS | 100 | 0 | 0 | 0 |
| Engage 8200 1.95% VTEOS | 0 | 100 | 0 | 100 |
| Engage 8200 2.5% VTEOS | 0 | 0 | 100 | 0 |
| Dibutyl tin dilaurate | 0.025 | 0.025 | 0.025 | 0 |
| Zinc oxide | 0.2 | 0.2 | 0.2 | 0.2 |
| Azodicarbonamide | 14 | 14 | 14 | 14 |
| Parafinic process oil | 10 | 10 | 10 | 0 |
| Dicumyl peroxide | 0.8 | 0.8 | 0.8 | 0 |
| Anti-oxidant | 1 | 1 | 1 | 0 |

In each test case, the hot compounded materials were expanded in a press as described in Example 15. The catalyst free material (Example 17A) was heated for 60 minutes with other conditions the same. At the end of the second heating step, the completely foamed material was removed from the oven and cooled with water to room temperature. The resultant foam samples were uniform, fine celled materials. The materials were submitted for physical property testing, the results of which are summarized in Table IV.

TABLE IV

| Property | Example 16 | Example 17 | Example 18 | Example 17A |
|---|---|---|---|---|
| Density (pcf) | 2.16 | 2.25 | 2.21 | 2.05 |
| Tensile (psi) | 33.7 | 39 | 45 | 34 |
| Elongation (%) | 410 | 347 | 254 | 633 |
| Deflection (psi) | 2.7 | 2.8 | 2.9 | 2.5 |
| 50% Compression Deflection (psi) | 9.1 | 9.3 | 9.2 | 8.7 |
| 50% Compression | 32.5 | 33.7 | 36.5 | 46 |

TABLE IV-continued

| Property | Example 16 | Example 17 | Example 18 | Example 17A |
|---|---|---|---|---|
| Set (%) (ASTM-3575) 50% Compression | 67.3 | 64.8 | 70.2 | 89 |
| Set (%) (ASTM-1056) Tear Die C (pli) | 4.4 | 4.8 | 5.7 | 4.5 |
| Durometer Shore 00 | 33 | 34 | 34.8 | 40 |
| Cell size average (mm) | 0.3 | 0.2 | 0.2 | 0.2 |
| Cell size min. (mm) | 0.05 | 0.05 | 0.05 | 0.05 |
| Cell size max. (mm) | 0.4 | 0.4 | 0.4 | 0.5 |

EXAMPLE 19

A slow silane-grafted essentially linear polyolefin resin was used to produce a non-EVA open cell bun material. The VTEOS-grafted VLDPE resin was grafted as described above and was compounded with other ingredients as described above in Example 15 to give a material having the following formulation:

| Formulation Component | Example 19 PHR |
|---|---|
| Engage 8200 1% VTEOS | 100 |
| Dibutyl tin dilaurate | 0.5 |
| Zinc oxide | 0.5 |
| Azodicarbonamide | 16 |
| Calcium carbonate | 15 |
| Dicumyl peroxide | 0.2 |

Multiple sheets were plied up into a pre-form for molding in a 1"×7"×10" high pressure hydraulic press mold while still hot. The mold containing the hot compound was put between heated high pressure hydraulic press platens under pressure for 25 minutes at 275° F. at 500 psi. The mold was released and the resulting material was removed from the hydraulic press mold and inserted into a lower pressure mold cavity of the expected final dimensions of 3"×18"×24". The material was allowed to complete cross-linking and expansion in the lower pressure mold cavity for 90 minutes at 330° F. The mold cavity and foamed material therein was cooled with water to room temperature. The expanded material was removed from the mold, yielding a medium fine open cell type of foam having the physical properties summarized in Table V.

TABLE V

| | Example 19 | |
|---|---|---|
| Property | Top | Middle |
| Density (pcf) | 2.3 | 1.82 |
| Tensile (psi) | 19.2 | 23.1 |
| Elongation (%) | 354 | 284 |
| 25% Compression Deflection (psi) | 0 | 0.33 |
| 50% Compression Deflection (psi) | 0.33 | 0.65 |
| 50% Compression Set (%) (ASTM-3575) | 3.13 | 3.61 |
| 50% Compression Set (%) (ASTM-1056) | 5.42 | 9.35 |
| Tear Die C (pli) | 7.3 | 6.05 |
| Durometer Shore 00 | 15 | 18 |
| Cell size average (mm) | 0.6 | 0.48 |

TABLE V-continued

| | Example 19 | |
|---|---|---|
| Property | Top | Middle |
| Cell size min. (mm) | 0.05 | 0.07 |
| Cell size max. (mm) | 0.6 | 1.29 |

EXAMPLE 20

This example demonstrates the use of a co-cure system of slow silane-graft cross-linking and Vulcup peroxide cross-linking to produce a cross-linked polyolefinic foam with low or no odor in comparison to materials made with odor causing peroxides such as Dicup. The silane-grafted resins and compounded formulations were prepared as described in Example 15 according to the following formulation:

| Formulation | Example 20 |
|---|---|
| Component | PHR |
| Engage 8200 1.95% VTEOS | 100 |
| Dibutyl tin dilaurate | 0.25 |
| Zinc oxide | 0.2 |
| Azodicarbonamide | 14 |
| Vulcup 100% active | 0.4 |
| Anti-oxidant | 1 |

The material was then plied up to fit into a 1.25"×6"×6" mold cavity.

The composition was expanded as described in Example 15, however, the second heat treatment (at 320° F.) lasted about 60 minutes. The resulting expanded material was a white, fine celled foam that was allowed to cool and age prior to skiving for physical property testing (Table VI).

TABLE VI

| Property | Example 20 |
|---|---|
| Density (pcf) | 2.06 |
| Tensile (psi) | 58 |
| Elongation (%) | 333 |
| 25% Compression Deflection (psi) | 3.03 |
| 50% Compression Deflection (psi) | 9.8 |
| 50% Compression Set (%) (ASTM-3575) | 35 |
| 50% Compression Set (%) (ASTM-1056) | 68 |
| Tear Die C (pli) | 5.2 |
| Durometer Shore 00 | 31 |
| Cell size average (mm) | 0.2 |
| Cell size min. (mm) | 0.05 |
| Cell size max. (mm) | 0.7 |

EXAMPLES 21–26

Silane-grafted essentially linear polyolefin resins can be blended with polypropylene to produce a continuous sheet foam material with improved heat resistant properties. In these Examples, six silane-grafted polyolefin blends were prepared with the formulations listed in Table VII by the methods described in Examples above:

TABLE VII

| Component | Ex. 21 | Ex. 22 | Ex. 23 | Ex. 24 | Ex. 25 | Ex. 26 |
|---|---|---|---|---|---|---|
| Engage 8200 | 75 | 75 | 75 | 75 | 75 | 75 |
| Engage 8445 | 22 | 22 | 22 | 22 | 22 | 22 |
| Processing Aid[1] | 3 | 3 | 3 | 3 | 3 | 3 |
| Silane[2] | VTMOS | VTMOS | VTMOS | VTEOS | VTEOS | VTEOS |
| Silane content[3] | 0.37 | 1.00 | 1.90 | 1.00 | 1.50 | 2.00 |

Note[1] The processing aid concentrate was SAX 7401, fluoroelastomer processing aid, Dupont Chemical Co.
Note[2] 20 parts silane to 1 part Vulcup R peroxide were combined for grafting.
Note[3] Silane content is noted in parts per hundred parts resin blend.

Each of the silane-grafted resins was blended into the following formulation (parts by weight):

| Component | Formulation (parts by weight) |
|---|---|
| Grafted resin from Table VII | 0.795 |
| Catalyst Compound[1] | 0.010 |
| Foaming Agent Compound[2] | 0.130 |
| Zinc Activator Compound[3] | 0.040 |
| Titanium Oxide Compound[4] | 0.025 |

Note[1] 98% LDPE, 1% Irganox 1010 AO, 1% dibutyl tin dilaurate.
Note[2] 60% EVA resin, 40% azodicarbonamide.
Note[3] 70% LDPE, 10% zinc oxide, 20% zinc stearate.
Note[4] 50% LDPE, 50% titanium dioxide.

Each of the materials were blended and extruded using a 2.5 inch diameter 24:1 L:D single screw extruder and a 14 inch sheet die. The melt temperature and residence time were controlled to prevent premature foaming of the sheet. The resulting unfoamed sheet was cross-linked by exposure to warm moist air as described below, and foamed by passing through a vertical foaming chamber where the sheet was rapidly heated to 400°–450° C., causing the foaming agent to decompose to form a foam of fine cell structure. The physical properties are summarized in Table VIII.

TABLE VIII

| Property[1] | Ex. 21 | Ex. 22 | Ex. 23 | Ex. 24 | Ex. 25 | Ex. 26 |
|---|---|---|---|---|---|---|
| Density (pcf) | 4.8 | 5.3 | no foam | 5.2 | 5.6 | 6.5 |
| Tensile (psi) | 123 | 88 | | 119 | 139 | 200 |
| Elongation (%) | 658 | 450 | | 622 | 519 | 417 |
| Tear Die C (pli) | 16 | 16 | | 16 | 19 | 23 |
| 25% Compression Deflection (psi) | 5.6 | 5.5 | | 5.8 | 6.1 | 9.1 |
| 50% Compression Deflection (psi) | 15.4 | 16.3 | | 15.2 | 16.1 | 21.7 |
| 50% Compression Set (%) | 16 | 12 | | 13 | 9 | 5 |
| Durometer Shore 00 | 65 | 60 | | 63 | 64 | 66 |
| Cell size average (mm) | 0.25 | 0.3 | | 0.3 | 0.3 | 0.2 |
| Thickness (inches) | 0.101 | 0.110 | | 0.085 | 0.095 | 0.117 |

Note[1] Properties were measured according to ASTM D-3575, with the exception of cell size average which was measured optically.

Examples 21, 22, and 23 had increasing levels of VTMOS silane. Examples 22 and 23 used a 50/50 blend of grafted resin with Engage 8200. Efforts to increase the concentration of grafted resin resulted in poor quality foam due to inability of the matrix to expand because the cross-linking level was too high at the time of foaming. Even at that concentration, the matrix for Example 23 could not be expanded without severe blistering, which is caused by over cross-linking. The compression set was reduced from 16 to 12 percent when silane level was increased from 0.37 to 1.0.

Examples 24, 25, and 26 were produced with increasing levels of VTEOS. Higher levels of VTEOS were attainable because the cross-linking level can be controlled for ideal foaming, and the material can continue to cross-link after foaming, yielding higher physical properties relative to the VTMOS foams.

Compression set can be used as an indicator of cross-linking level in the materials. In general, the higher the level of cross-linking, the lower the compression set. Low compression set is desirable in load bearing applications such as shoe parts, packaging, and industrial gasketing. At the highest attainable VTMOS level, compression set is 12 percent. Due to the ability to add twice as much VTEOS in the slow silane system, a material having a compression set of 5 percent was obtained at the expense of a higher density, 6.5 vs. 5, due to the tighter cross-linking network that restricted foam expansion. Tensile strength and cell size were also dramatically improved. Higher tensile strength and lower elongation are further indications of higher cross-linking levels in the slow silane materials.

EXAMPLE 27

The slow silane-grafted polyolefinic resin can be used to produce a 5 pcf continuous sheet foam material with improved physical properties. A slow silane-grafted polyolefin resin was prepared using the following formulation according to the Examples described above:

| Component | Example 27 |
|---|---|
| Engage 8200 | 97 |
| Processing Aid[1] | 3 |
| Silane[2] | VTEOS |
| Silane content[3] | 1.60 |

Note[1] The processing aid concentrate was SAX 7401, fluoroelastomer processing aid, Dupont Chemical Co.
Note[2] 20 parts silane to 1 part Vulcup R peroxide were combined.
Note[3] Silane content in parts per hundred parts resin blend.

The grafted resin was incorporated into the compound formulation:

| Component | Formulation (parts by weight) |
| --- | --- |
| Grafted resin | 0.795 |
| Catalyst Compound[1] | 0.010 |
| Foaming Agent Compound[2] | 0.130 |
| Zinc Activator Compound[3] | 0.040 |
| Titanium Oxide Compound[4] | 0.025 |

Note[1] 98% LDPE, 1% Irganox 1010 AO, 1% dibutyl tin dilaurate.
Note[2] 60% EVA resin, 40% azodicarbonamide.
Note[3] 70% LDPE, 10% zinc oxide, 20% zinc stearate.
Note[4] 50% LDPE, 50% titanium dioxide.

The material was extruded as described in Examples 21–26. Samples were exposed to processing conditions for expansion into foams as shown in Table IX.

TABLE IX

| Example | Cross-linking time at 150° F. (hours) | Wet Bulb Temperature (minimum) | Post Expansion Time at 150° F. (hours) | Wet Bulb Temperature (minimum) |
| --- | --- | --- | --- | --- |
| 27A | 3 | 145° F. | 0 | 145° F. |
| 27B | 6 | 145° F. | 0 | 145° F. |
| 27C | 9 | 145° F. | 0 | 145° F. |
| 27D | 16.5 | 145° F. | 0 | 145° F. |
| 27E | 3 | 145° F. | 66 | 145° F. |

The Example foams 27A–E were tested. The physical properties are summarized in Table X.

TABLE X

| Property[1] | Ex. 27A | Ex. 27B | Ex. 27C | Ex. 27D | Ex. 27E |
| --- | --- | --- | --- | --- | --- |
| Density (pcf) | 5.4 | 5.1 | 5.5 | 6 | 5.5 |
| Tensile (psi) | 121 | 116 | 143 | 171 | 114 |
| Elongation (%) | 628 | 610 | 576 | 542 | 602 |
| Tear Die C (pli) | 16 | 14 | 17 | 20 | 14 |
| 25% Compression Deflection (psi) | 5.1 | 4.7 | 5.5 | 6 | 13.5 |
| 50% Compression Deflection (psi) | 15.5 | 14.9 | 16.3 | 16.8 | 16.4 |
| 50% Compression Set (%) | 21 | 20 | 10 | 7 | 32 |
| Durometer Shore 00 | 59 | 55 | 59 | 61 | 60 |
| Cell size average (mm) | 0.30 | 0.30 | 0.3 | 0.25 | 0.3 |
| Thickness (inches) | 0.100 | 0.089 | 0.113 | 0.108 | 0.101 |

Note[1] Properties were measured according to ASTM D-3575, with the exception of cell size average which was measured optically.

This Example shows the effect of increased cross-linking time on the properties of the finished foam. Increasing cross-linking time incrementally from 3 to 16.5 hours produces an increase in physical properties, notably compression set and tensile strength. In this case, attempts to cross-link the material after foaming by exposure to 150° F. for 66 hours produced lowered physical properties. This is probably attributable to deterioration of the polymer rather than low cross-linking levels in the material.

EXAMPLES 28–30

In these Examples, 100% essentially linear polyolefin resin is used to produce an extruded sheet utilizing a slow silane continuous cure/foaming system. Two silane-grafted resin blends were prepared with the following formulations, as described in previous Examples (Table XI).

TABLE XI

| Component | Example 28 | Example 29 | Example 30 (blank) |
| --- | --- | --- | --- |
| Engage 8200 | 97 | 97 | 97 |
| Processing Aid[1] | 3 | 3 | 3 |
| Silane[2] | VTEOS | VTEOS | 0 |
| Silane content[3] | 1.30 | 2.00 | 0.00 |

Note[1] The processing aid concentrate was SAX 7401, fluoroelastomer processing aid, Dupont Chemical Co.
Note[2] 20 parts silane to 1 part Vulcup R peroxide were combined.
Note[3] Silane content in parts per hundred parts resin blend.

Each of the resins were then blended according to the following formulation:

| Component | Formulation (parts by weight) |
| --- | --- |
| Resin from Table XI | 0.920 |
| Catalyst Compound[1] | 0.005 |
| Foaming Agent Compound[2] | 0.010 |
| Zinc Activator Compound[3] | 0.040 |
| Titanium Oxide Compound[4] | 0.025 |

Note[1] 98% LDPE, 1% Irganox 1010 AO, 1% dibutyl tin dilaurate.
Note[2] 60% EVA resin, 40% azodicarbonamide.
Note[3] 70% LDPE, 10% zinc oxide, 20% zinc stearate.
Note[4] 50% LDPE, 50% titanium dioxide.

The compounds above were extruded using the extruder of Example 21 at a melt temperature of 400° F., which caused the foaming agent to decompose in the extruder, resulting in foam being extruded from the die. The foam was cooled and rolled. The foams had properties described in the following table:

| Property[1] | Example 28 | Example 29 | Example 30 (blank) |
| --- | --- | --- | --- |
| Density (pcf) | 29 | 33 | 34 |
| Tensile (psi) | 479 | 520 | 344 |
| Elongation (%) | 703 | 665 | 640 |
| Tear Die C (pli) | 72 | 80 | 81 |
| 25% Compression Deflection (psi) | 58 | 60 | 54 |
| 50% Compression Deflection (psi) | 216 | 243 | 211 |
| Durometer Shore 00 | 85 | 86 | 84 |
| Cell size average (mm) | 0.40 | 0.30 | 0.25 |
| Thickness (inches) | 0.054 | 0.055 | 0.054 |

Note[1] Properties were measured according to ASTM D-3575, with the exception of cell size average which was measured optically.

Grafting VTEOS improved the tensile strength from 344 with 0% VTEOS, to 479 with 1.3% and 520 with 2% VTEOS. Cell size is reduced significantly. Attempts to duplicate these results with a fast silane (VTMOS) were unsuccessful since there was premature cross-linking in the die which caused unacceptable gels and irregular sheet forms. Hardness was not effected.

EXAMPLE 31

The slow silane-grafted materials (VTEOS or other slower silane grafts) have a wider processing window and allows for higher cross-linking levels in the finished product. In this example, a sheet of the following formulation was produced:

|  |  |
|---|---|
| Grafted resin of Example 23 | 0.965 |
| Catalyst Compound[1] | 0.010 |
| Titanium Oxide Compound[2] | 0.025 |

Note[1] 98% LDPE, 1% Irganox 1010 AO, 1% dibutyl tin dilaurate
Note[2] 50% LDPE, 50% titanium dioxide.

The compound was extruded using the extruder of Example 21 with a melt temperature of 300° F. The resulting sheet cross-linked in the machine prior to extrusion and causing gels to form in the sheet. The sheet was of unacceptable quality for commercial applications.

The compound was modified using the grafted resin of Example 29 (Engage 8200/Processing Aid:97/3×2% VTEOS blend listed in Table XI) in place of the grafted resin of Example 23, listed in Table VII. The formulation was extruded and produced a smooth sheet. The tensile strength and elongation could not be determined because the material stretched beyond the limits of the tensile testing machine. The ultimate elongation of the material was in excess of 900% and tensile strength was in excess of 1000 psi.

EXAMPLES 32–33

These Examples employ a VTEOS silane-grafted essentially linear olefin copolymer and a blended VTEOS/9116 silane-grafted essentially linear olefin copolymer. The materials were cross-linked and expanded to produce cross-linked polyolefinic foams.

The grafted resins were prepared as described in Example 15. In each Example, the grafted resin was compounded with other ingredients described in Example 15 according to the following formulations:

| Formulation | Example 32 | Example 33 |
|---|---|---|
| Component | PHR | PHR |
| Engage 8200 2% VTEOS graft | 100 | 0 |
| Engage 8200 2% 95/5 VTEOS/9116 graft | 0 | 100 |
| Dibutyl tin dilaurate | 0.025 | 0.025 |
| Zinc oxide | 0.2 | 0.2 |
| Azodicarbonamide | 14 | 14 |
| Paraffinic process oil | 10 | 10 |
| Dicumyl peroxide | 0.8 | 0.8 |
| Anti-oxidant | 1 | 1 |

In each test case, the hot compounded materials were expanded in a press as described in Example 15, except that the semi-cured and foamed buns were cured for approximately 50 minutes at approximately 320° F. The resulting foam samples were uniform, fine celled materials. The materials were submitted for physical property testing, the results of which are summarized in Table IV.

TABLE XII

| Property | Example 32 | Example 33 |
|---|---|---|
| Density (pcf) | 2.25 | 2.28 |
| Tensile (psi) | 39 | 37 |
| Elongation (%) | 347 | 404 |
| 25% Compression Deflection (psi) | 2.8 | 3.1 |
| 50% Compression Deflection (psi) | 9.3 | 9.8 |
| 50% Compression Set (%) (ASTM-3575) | 33 | 34 |
| 50% Compression Set (%) (ASTM-1056) | 64 | 66 |
| Tear Die C (pli) | 4.7 | 4.5 |
| Split Tear | 3.5 | 4.3 |
| Durometer Shore 00 | 34 | 35 |
| Cell size average (mm) | 0.2 | 0.2 |
| Cell size min. (mm) | 0.05 | 0.05 |
| Cell size max. (mm) | 0.4 | 0.45 |

The physical property testing results were very similar. One significant difference was noted in the improved elongation characteristics of the foam produced with the blend of VTEOS/9116 silane. Another observed difference was the greater processing window indicated in the slower VTEOS/9116 blend material verses the VTEOS alone, as discussed in Example 31.

What is claimed is:

1. A polyolefin article comprising a silane-grafted single-site initiated olefin copolymer resin having a silane-graft content of up to 6 percent, wherein the olefin copolymer resin has a density between about 0.86 and about 0.96 g cm$^{-3}$, a molecular weight distribution between about 1.5 and about 3.5, a melt index in the range of about 0.5 dg/min to about 100 dg/min, and a composition distribution breadth index greater than about 45 percent, and the silane comprises a silane having a C2 to C10 alkoxy group.

2. The polyolefin article of claim 1, comprising a partially cross-linked polyolefin blend, the polymer blend including the olefin copolymer resin.

3. The polyolefin article of claim 2, wherein the olefin copolymer resin is a polyethylene, a copolymer of ethylene and a C3–C20 alpha-olefin, a polypropylene, or a copolymer of ethylene, a C3–C20 alpha-olefin and a C4–C20 diene.

4. The polyolefin article of claim 3, wherein the article has a gel content of between 10 and 100 percent.

5. The polyolefin article of claim 4, wherein the olefin copolymer resin contains between about 0.1 and 2 percent silane-graft.

6. The polyolefin article of claim 5, wherein the silane includes a vinyl silane having 2 or 3 hydrolyzable groups.

7. The polymer article of claim 6, wherein the polymer blend comprises between about 5 and 95 weight percent of the olefin copolymer resin.

8. The polyolefin article of claim 6, wherein the hydrolyzable groups are C2–C10 alkoxy groups.

9. The polyolefin article of claim 8, wherein the silane includes vinyl triethoxysilane.

10. The polyolefin article of claim 6, wherein the polymer blend further comprises a copolymer including ethylene and propylene, an ethylene-propylene-diene terpolymer, an ethylene-vinyl acetate copolymer, an ethylene-maleic anhydride copolymer, an ethylene-ethyl acetate copolymer, a low density polyethylene, a linear low density polyethylene, a medium density polyethylene, a high density polyethylene, or a polypropylene.

11. The polyolefin article of claim 10, wherein the polymer blend is partially silane-grafted.

12. The polyolefin article of claim 1, further comprising maleic anhydride.

13. The polyolefin article of claim 1, wherein the article is foamed.

14. The polyolefin article of claim 10, wherein the polymer blend is foamed.

15. The polyolefin article of claim 14, further comprising a cell nucleating agent and a gas exchange additive.

16. The polyolefin article of claim 14, wherein the foamed polymer blend is in the form of a sheet, plank, laminated plank, bead, or extruded profile.

17. The polyolefin article of claim 14, wherein the foamed polymer blend has an average foam density between 1.0 and 50 pounds per cubic foot.

18. The polyolefin article of claim 1, wherein the silane further comprises an alkyl trialkoxy silane, where the alkyl is a C1 to C20 group and the alkoxy is a C1 to C10 group.

19. The polymer article of claim 14, wherein the foamed polymer blend is a closed cell foam.

20. The polymer article of claim 13, wherein the foamed polymer blend is an open cell foam.

21. A method of making a polymer article comprising the steps of:

providing a mixture including silane-grafted single-site initiated olefin copolymer resin having a density between about 0.86 and about 0.96 g cm$^{-3}$, a molecular weight distribution between about 1.5 and about 3.5, a melt index in the range of about 0.5 dg/min to about 100 dg/min, and a composition distribution breadth index greater than about 45 percent, and a foaming agent, where the silane includes a silane having a C2 to C10 alkoxy group; and cross-linking the polymer mixture.

22. The method of claim 21, wherein the mixture is a silane cross-linkable polymer blend.

23. The method of claim 22, wherein the providing step includes the step of blending the olefin copolymer resin with a copolymer including ethylene and propylene, an ethylene-propylene-diene terpolymer, an ethylene-vinyl acetate copolymer, an ethylene-maleic anhydride copolymer, an ethylene-ethyl acetate copolymer, a low density polyethylene, a linear low density polyethylene, a medium density polyethylene, a high density polyethylene, or a polypropylene.

24. The method of claim 23, wherein the providing step includes the step of silane-grafting a portion of the mixture.

25. The method of claim 24, further comprising the step of grafting the polymer blend with a silane.

26. The method of claim 25, wherein the silane includes a vinyl silane having 2 or 3 hydrolyzable groups.

27. The method of claim 26, wherein the hydrolyzable groups are C2–C10 alkoxy groups.

28. The method of claim 27, wherein the silane includes vinyl triethoxysilane.

29. The method of claim 21, further comprising the step of expanding the polymer blend to form a foam.

30. The method of claim 22, further comprising the step of expanding the polymer blend to form a foam.

31. The method of claim 30, further comprising the step of partially cross-linking the polymer blend prior to the expanding step.

32. The method of claim 31, wherein the step of cross-linking the polymer blend includes exposing the polymer mixture to moisture.

33. The method of claim 30, further comprising the step of cross-linking the polymer blend after the expanding step.

34. The method of claim 26, further comprising the step extruding the polymer mixture.

35. The method of claim 32, wherein the step of cross-linking the polymer blend further includes reacting the polymer blend with a peroxide.

36. The method of claim 35, further comprising the step of expanding the polymer blend to form a foam.

37. The method of claim 36, wherein the step of expanding the polymer blend comprises compression molding the polymer mixture at increased temperature and pressure.

38. The method of claim 37, wherein the compression molding comprises the steps of pressing the polymer mixture using a high tonnage press at a temperature of between 275° and 320° F. and a pressure of between 250 and 2500 psi for between 20 and 90 minutes followed by heating the polymer mixture at a temperature between 300° and 380° F.

39. The method of claim 21, further comprising the step of applying a coating to the polymer.

40. A foamed polyolefin article comprising a silane-grafted single-site initiated olefin copolymer resin having a silane-graft content of up to 6 percent, wherein the olefin copolymer resin has a density between about 0.86 and about 0.96 g cm$^{-3}$, a molecular weight distribution between about 1.5 and about 3.5, a melt index in the range of about 0.5 dg/min to about 100 dg/min, and a composition distribution breadth index greater than about 45 percent, and the silane comprises a vinyl silane having a C1 to C10 alkoxy group.

41. The polyolefin article of claim 1, wherein the olefin copolymer resin is a copolymer of ethylene with a styrene.

42. The polyolefin article of claim 2, wherein the polymer blend further comprises a polystyrene.

43. The method of claim 21, wherein the olefin copolymer resin is a copolymer of ethylene with a styrene.

44. The method of claim 22, wherein the polymer blend further comprises a polystyrene.

45. The article of claim 1, wherein the olefin copolymer resin is a metallocene catalyzed polyolefin.

46. The method of claim 20, wherein the olefin copolymer resin is a metallocene catalyzed polyolefin.

47. The method of claim 40, wherein the olefin copolymer resin is a metallocene catalyzed polyolefin.

* * * * *